(12) United States Patent
Tonooka et al.

(10) Patent No.: US 8,824,027 B2
(45) Date of Patent: Sep. 2, 2014

(54) MEDIA FEEDER, IMAGE SCANNING APPARATUS, MULTIFUNCTIONAL PERIPHERY, AND IMAGE SCANNING METHOD

(75) Inventors: Naoya Tonooka, Tokyo (JP); Hidenori Ueda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 826 days.

(21) Appl. No.: 12/955,148

(22) Filed: Nov. 29, 2010

(65) Prior Publication Data

US 2011/0128596 A1    Jun. 2, 2011

(30) Foreign Application Priority Data

Nov. 30, 2009   (JP) ................... 2009-272092

(51) Int. Cl.
*H04N 1/04*      (2006.01)
*H04N 1/00*      (2006.01)
*G03G 15/00*     (2006.01)

(52) U.S. Cl.
CPC ....... *H04N 1/00567* (2013.01); *H04N 1/00588* (2013.01); *H04N 1/00641* (2013.01); *H04N 1/00612* (2013.01); *H04N 1/00618* (2013.01); *H04N 1/00591* (2013.01); *H04N 1/00602* (2013.01); *H04N 1/00649* (2013.01)
USPC ........... 358/498; 358/496; 358/474; 399/367; 399/374

(58) Field of Classification Search
None
See application file for complete search history.

(56) References Cited

U.S. PATENT DOCUMENTS

| 7,791,771 | B2 * | 9/2010 | Shiraishi | 358/475 |
| 7,924,474 | B2 * | 4/2011 | Itoh | 358/474 |
| 8,054,483 | B2 * | 11/2011 | Katsuyama | 358/1.14 |
| 8,289,589 | B2 * | 10/2012 | Matsushima | 358/498 |
| 8,358,451 | B2 * | 1/2013 | Kimura | 358/498 |
| 8,605,343 | B2 * | 12/2013 | Tokutsu | 358/498 |

FOREIGN PATENT DOCUMENTS

| JP | H07-064359 A | 3/1995 |
| JP | 11-263499 A | 9/1999 |
| JP | 2002-162793 A | 6/2002 |

* cited by examiner

*Primary Examiner* — David Moore
*Assistant Examiner* — Pawandeep Dhingra
(74) *Attorney, Agent, or Firm* — Marvin A. Motsenbocker; Mots Law, PLLC

(57) ABSTRACT

An automatic media feeder includes: a media stacker on which sheets are to be stacked; a discharged media stacker; a scanning position where the sheet is to be scanned; a first conveyance path from the media stacker to the scanning position; a feeding device configured to convey the sheet from the media stacker to the scan position along the first conveyance path; a discharging device configured to discharge the sheet that passed through the scanning position to the discharged media stacker; a first reverse mechanism configured to turn over the sheet conveyed from the media stacker toward the scanning position along the first conveyance path and return the turned-over sheet to the first conveyance path; and a second reverse mechanism configured to refeed the sheet that passes through the scanning position to the first conveyance path.

12 Claims, 18 Drawing Sheets

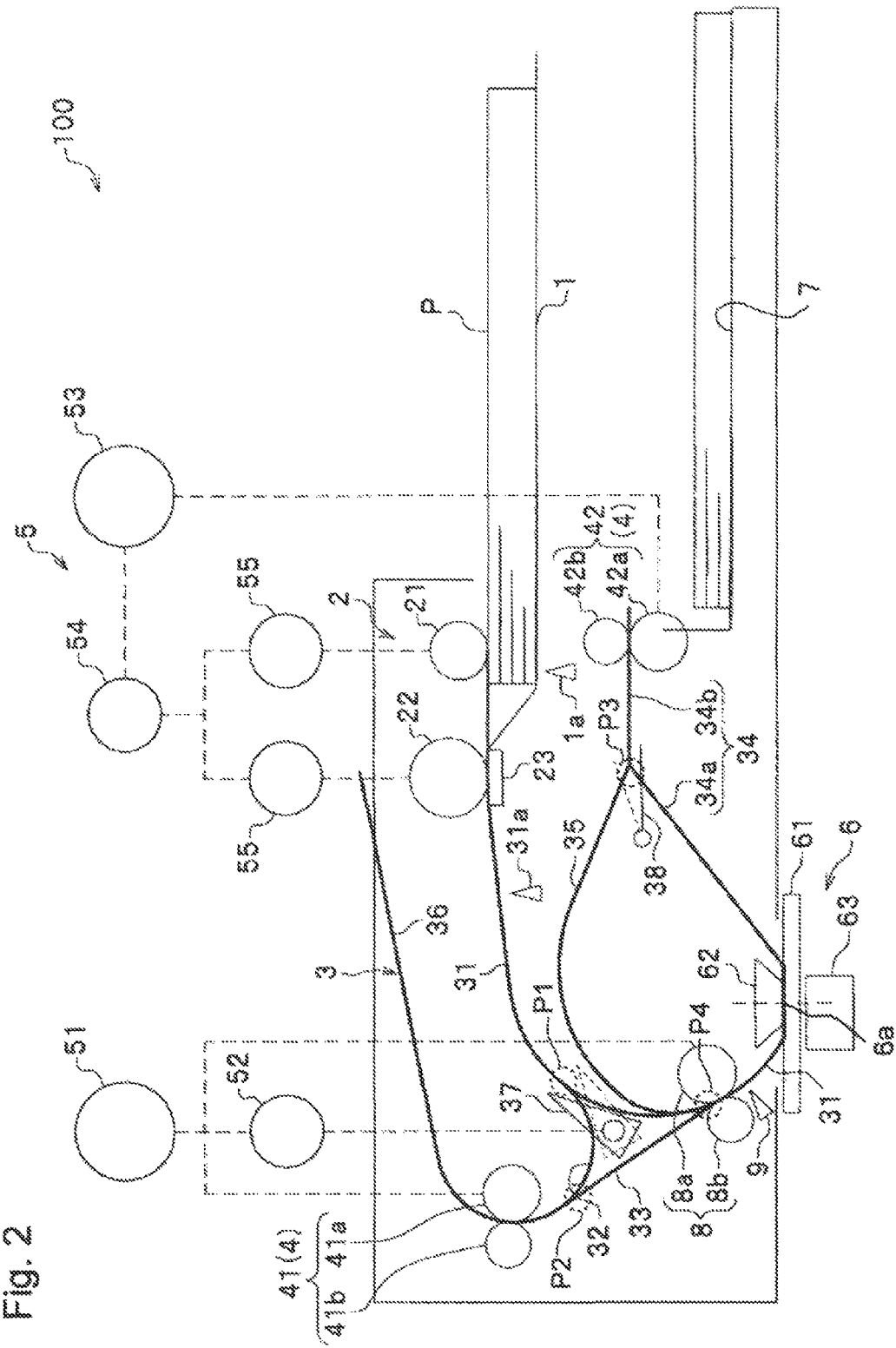

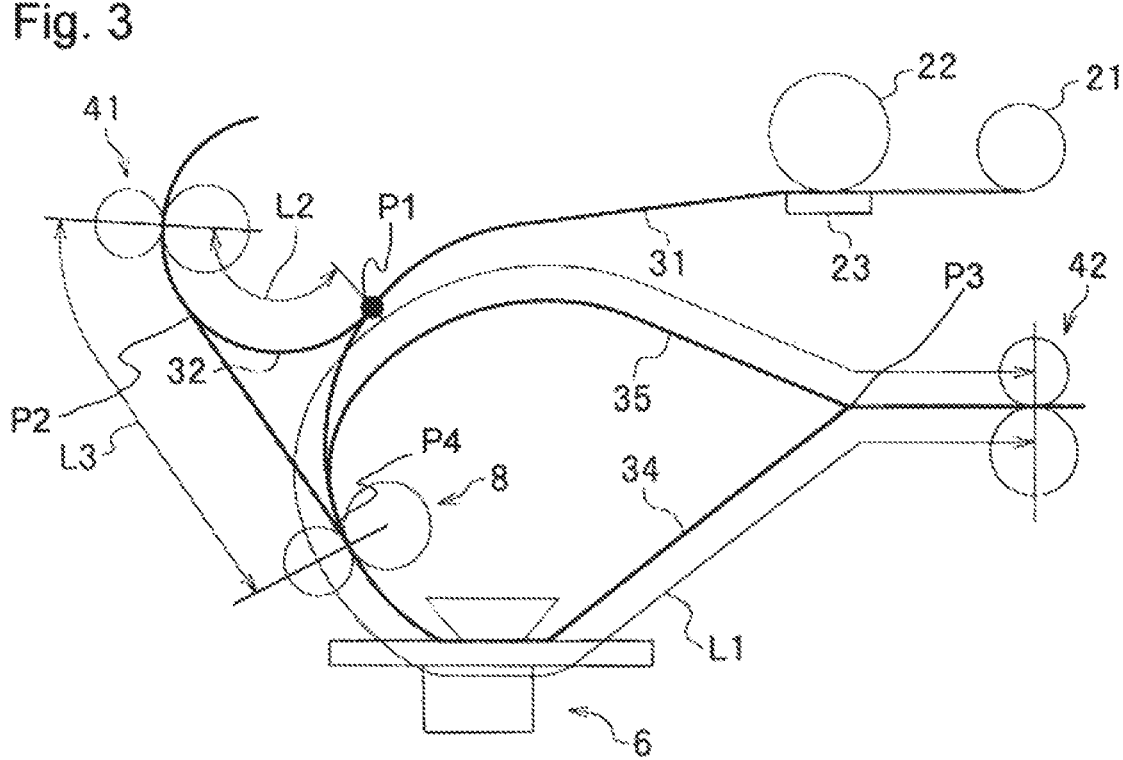

FIRST EMBODIMENT (BOTH-SIDE SCAN)

FIRST EMBODIMENT (BOTH-SIDE SCAN)

FIRST EMBODIMENT (BOTH-SIDE SCAN)

FIRST EMBODIMENT (SINGLE-SIDE SCAN)

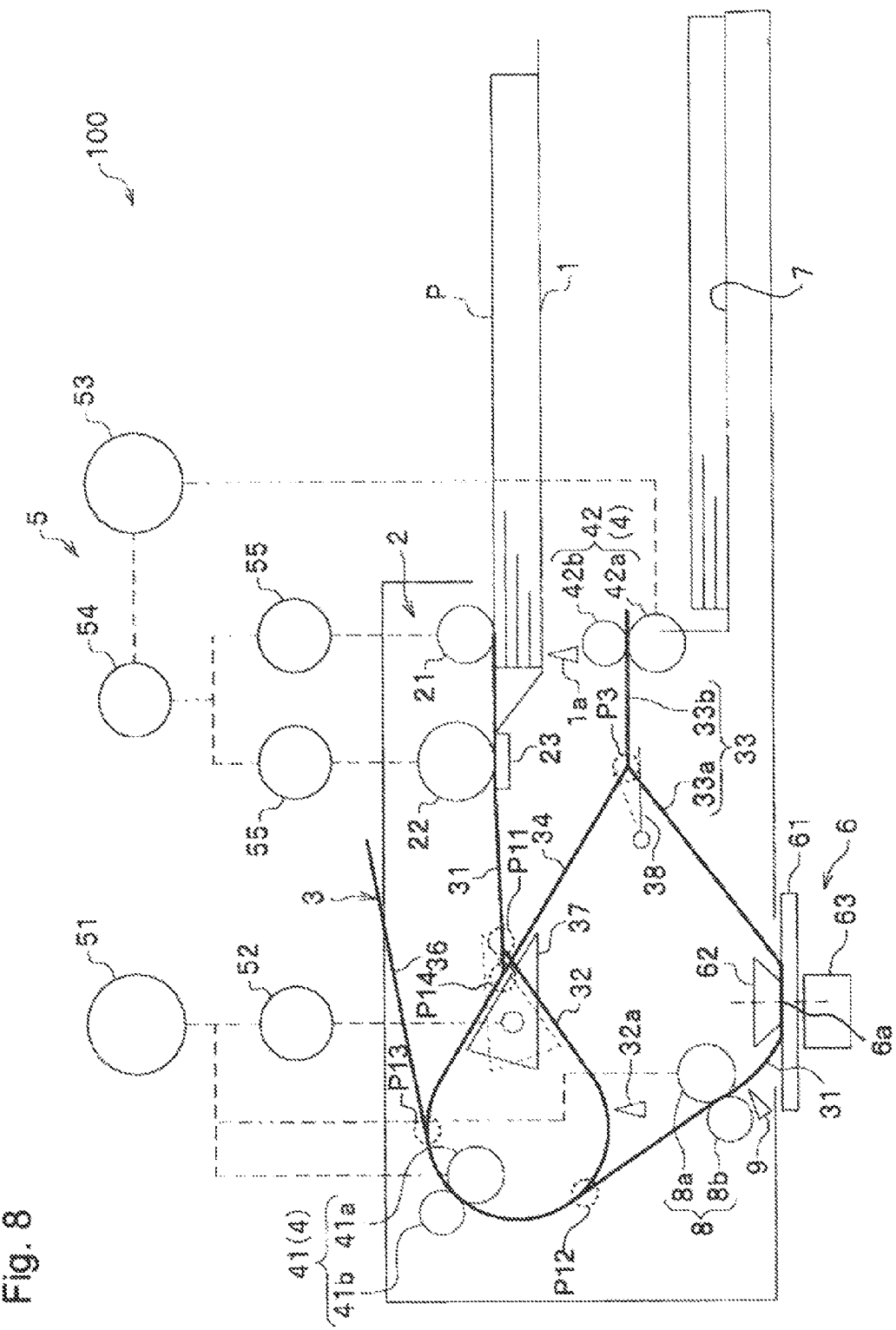

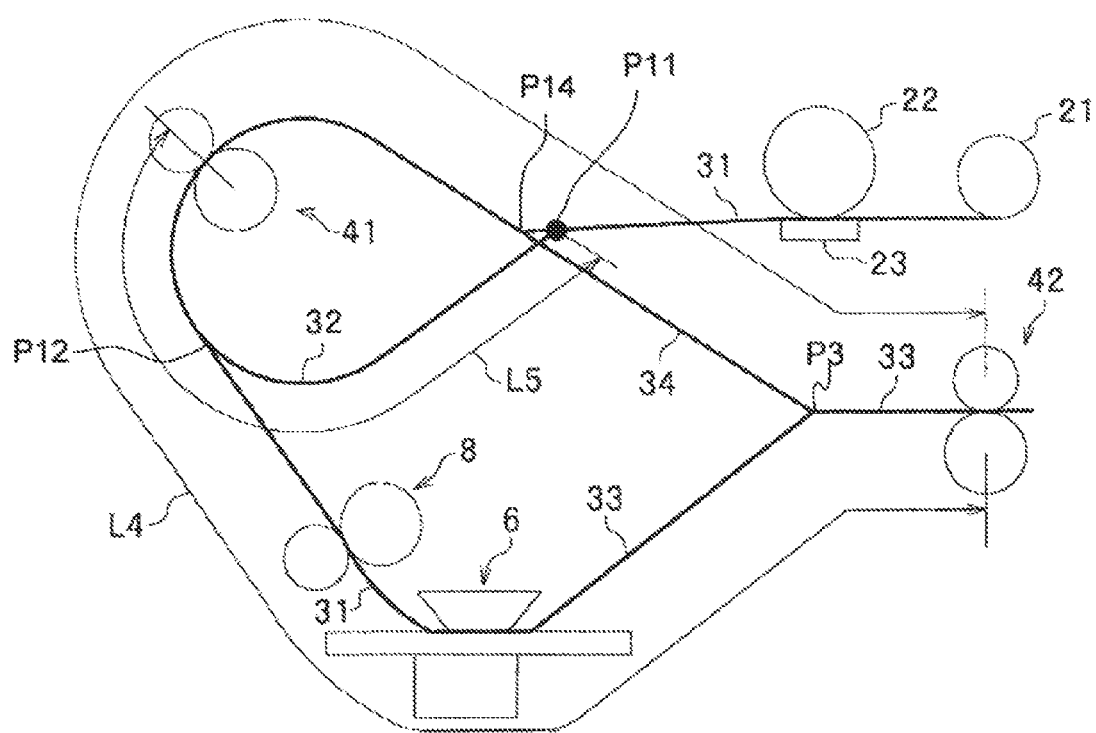

SECOND EMBODIMENT (BOTH-SIDE SCAN)

SECOND EMBODIMENT (BOTH-SIDE SCAN)

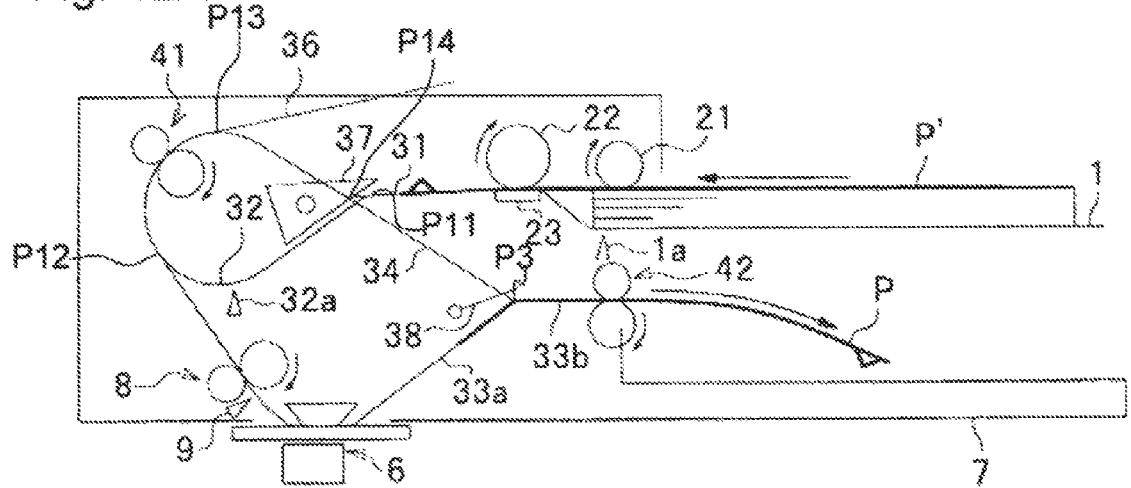

SECOND EMBODIMENT (SINGLE-SIDE SCAN)

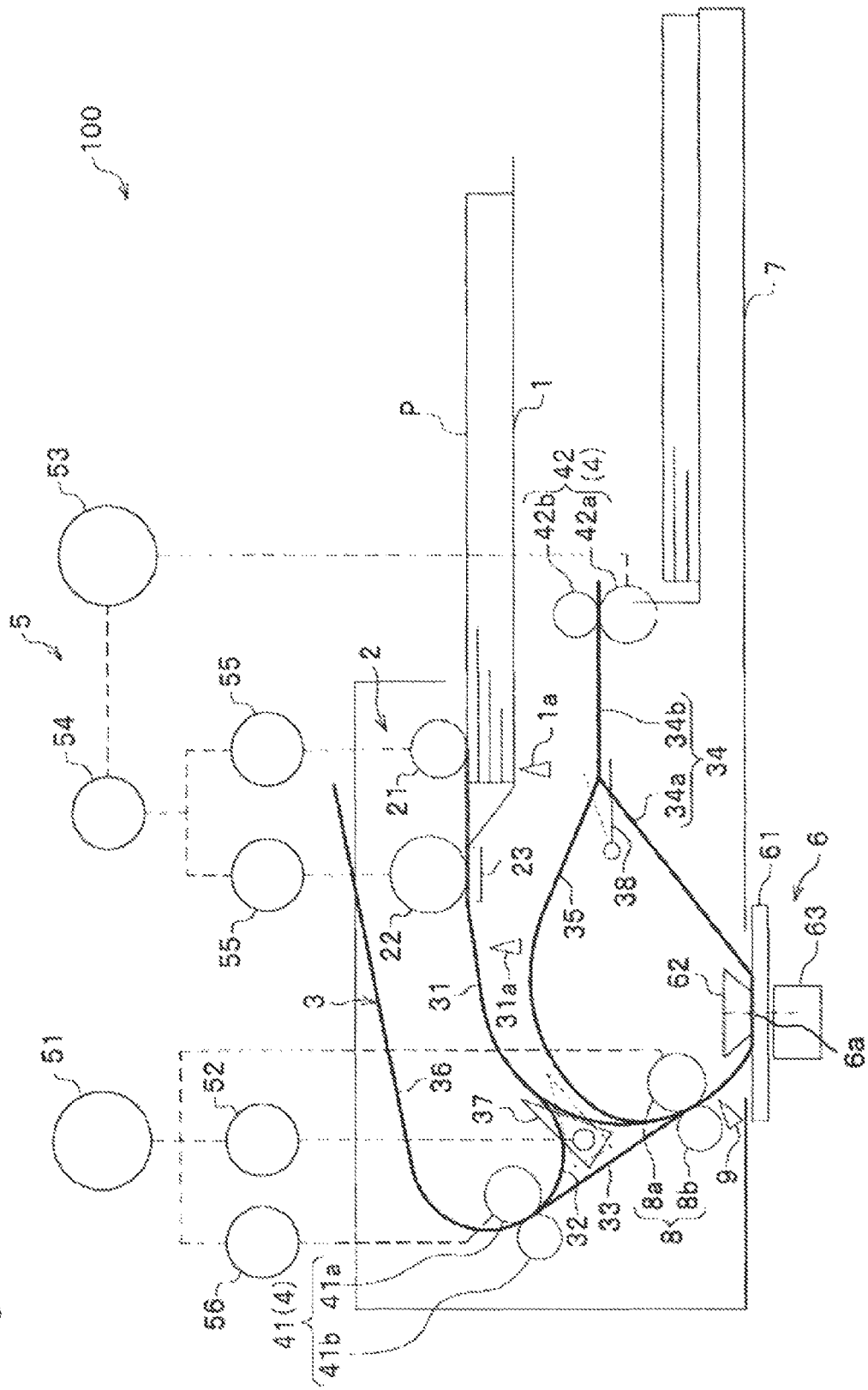

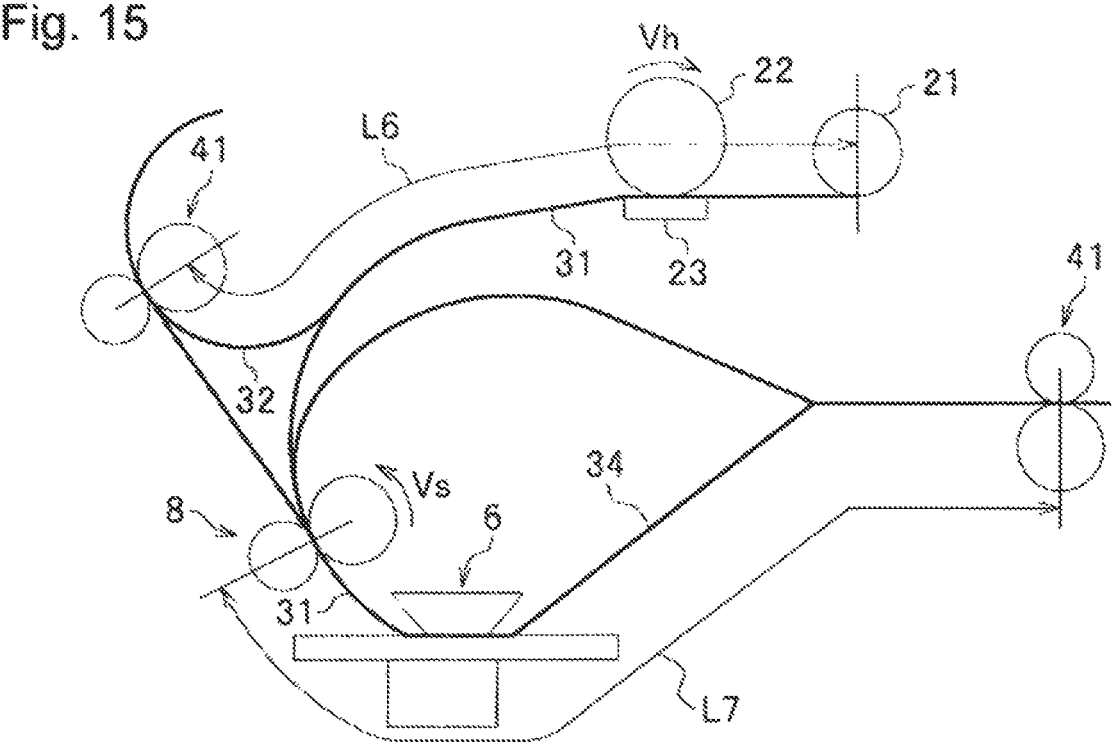

THIRD EMBODIMENT (BOTH-SIDE SCAN)

THIRD EMBODIMENT (BOTH-SIDE SCAN)

THIRD EMBODIMENT (BOTH-SIDE SCAN)

MEDIA FEEDER, IMAGE SCANNING APPARATUS, MULTIFUNCTIONAL PERIPHERY, AND IMAGE SCANNING METHOD

CROSS REFERENCE TO RELATED APPLICATIONS

This application claims priority based on 35 USC 119 from prior Japanese Patent Application No. P2009-272092 filed on Nov. 30, 2009, entitled "AUTOMATIC DOCUMENT FEEDER, IMAGE SCANNING APPARATUS, MULTIFUNCTIONAL PERIPHERY, AND IMAGE SCANNING METHOD", the entire contents of which are incorporated herein by reference.

BACKGROUND OF THE INVENTION

1. Field of the Invention

The invention relates to an automatic media feeder, an image scanning apparatus, a multifunctional periphery (MFP), and an image scanning method.

2. Description of Related Art

A conventional image scanning apparatus disclosed in Japanese Patent Application Laid-Open No. 7-64359 is capable of executing a double-side scanning operation to scan images including characters, figures, and the like on both sides of document sheets. In the double-side scanning operation, the conventional image scanning apparatus feeds a document sheet to a scan unit to scan the front side of the document sheet, reverses the document sheet at a switchback section to turn it over, and then re-feeds the document sheet to the scan unit to scan the back side of the document sheet.

Note that the front side of a document sheet means a side of the document sheet, which faced upward in a document stacker, and the rear side of the document sheet means a side of the document sheet, which faced downward in the document stacker.

SUMMARY OF THE INVENTION

In the case where the document sheets are fed to be scanned from the upmost document sheet among the document sheets stacked in the document stacker, the front side of each discharged document sheet has to face downward on a discharged document stacker to collate the discharged document sheets by pages in the original order.

In the conventional automatic document feeder disclosed in Japanese Patent Application Laid-Open No. 7-64359, the front side of the document sheet faces upward after both sides of the document sheet are scanned by the scan unit. Thus, in order to collate the discharged document sheets by pages, after both sides of the document sheet are scanned by the scan unit, the conventional automatic document feeder reverses the document sheet at the switchback section to turn it over, conveys the document sheet through the scan unit without executing the scanning process, and discharges the document sheet to the discharged document stacker such that the front side of the document sheet faces downward on the discharged document stacker. Therefore, this double-side scanning operation needs an additional passage of the document sheet through the scan unit, that is, this double-side scanning operation needs an additional contact of the document sheet with the scan unit, which may quickly smear apart of the scan unit such as the platen glass.

An object of an aspect of the invention is to provide an automatic media feeder, an image scanning apparatus, a multifunctional periphery (MFP), an image scanning method, or the like capable of reducing the number of contacts between media and a scan unit while collating, by pages, the media that are discharged on a discharged media stacker.

A first aspect of the invention is an automatic media feeder including: a media stacker on which sheets are to be stacked; a discharged media stacker; a scanning position where the sheet is to be scanned; a first conveyance path from the media stacker to the scanning position; a feeding device configured to convey the sheet from the media stacker to the scan position along the first conveyance path; a discharging device configured to discharge the sheet that passed through the scanning position to the discharged media stacker; a first reverse mechanism configured to turn over the sheet conveyed from the media stacker toward the scanning position along the first conveyance path and to return the turned-over medium to the first conveyance path; and a second reverse mechanism configured to refeed the sheet that passes through the scanning position to the first conveyance path.

A second aspect of the invention is an automatic media feeder including: a media input path, extending from a media stacker to a scanning position, along which a medium could be fed from the media stacker to the scanning position; a media output path, extending from the scanning position to a discharge media stacker, along which the medium could be discharged from the scanning position to the discharge media stacker; a first reversal mechanism configured to turn over the medium that is conveyed along the media input path and to return the medium to the media input path; and a second reversal mechanism configured to turn over the medium that is conveyed along the discharge path and to return the medium to the media input path.

A third aspect of the invention is an image scanning apparatus including: a scan unit configured to scan an image; a media stacker; a discharged media stacker; a first conveyance path from the media stacker to the scan unit; a feeding device configured to convey a medium from the media stacker to the scan unit along the first conveyance path; a discharging device configured to discharge the medium that passed through the scan unit to the discharged media stacker; a first reverse mechanism configured to turn over the medium conveyed from the media stacker toward the scan unit along the first conveyance path and to return the turned-over medium to the first conveyance path; and a second reverse mechanism configured to refeed the medium that passes through the scan unit to the first conveyance path.

A fourth aspect of the invention is a multifunctional periphery including: the image scanning apparatus according to the third aspect; and an image forming apparatus configured to form an image obtained by the image scanning apparatus on another medium.

A fifth aspect of the invention is an image scanning method including: a first step of turning over a medium; a second step of scanning a first side of the medium that is turned over in the first step; a third step of turning over the medium scanned in the second step; and a fourth step of scanning the other side of the medium turned over in the third step.

A sixth aspect of the invention is an image scanning method including: conveying a medium from a media stacker to a reverse mechanism; conveying the medium to a scan unit while turning over the medium by the reverse mechanism; scanning one side of the medium by the scan unit; re-feeding the medium whose one side is scanned by the scan unit to the scan unit while turning over the medium by a refeed/discharge mechanism; scanning the other side of the medium by the scan unit; and discharging the medium whose both sides are scanned by the scan unit to the discharged media stacker by the refeed/discharge mechanism.

According to the aspects of the invention, the number of contacts between the medium and the scanning position (or the scan unit) can be reduced even though the media discharged in the discharged media stacker are collated by pages.

BRIEF DESCRIPTION OF THE DRAWINGS

FIG. 2 is a vertical sectional view of a configuration of the image scanning apparatus according to the first embodiment.

FIG. 3 is an explanatory view of the configuration of the image scanning apparatus according to the first embodiment.

FIG. 8 is a vertical sectional view of a configuration of an image scanning apparatus according to a second embodiment.

FIG. 9 is an explanatory view of the configuration of the image scanning apparatus according to the second embodiment.

FIG. 12A is an explanatory view of the document conveyance procedure in the double-side scan operation of the image scanning apparatus according to the second embodiment.

FIG. 14 is a vertical sectional view of a configuration of an image scanning apparatus according to a third embodiment.

FIG. 15 is an explanatory view of the configuration of the image scanning apparatus according to the third embodiment.

DETAILED DESCRIPTION OF EMBODIMENTS

Figure 1:
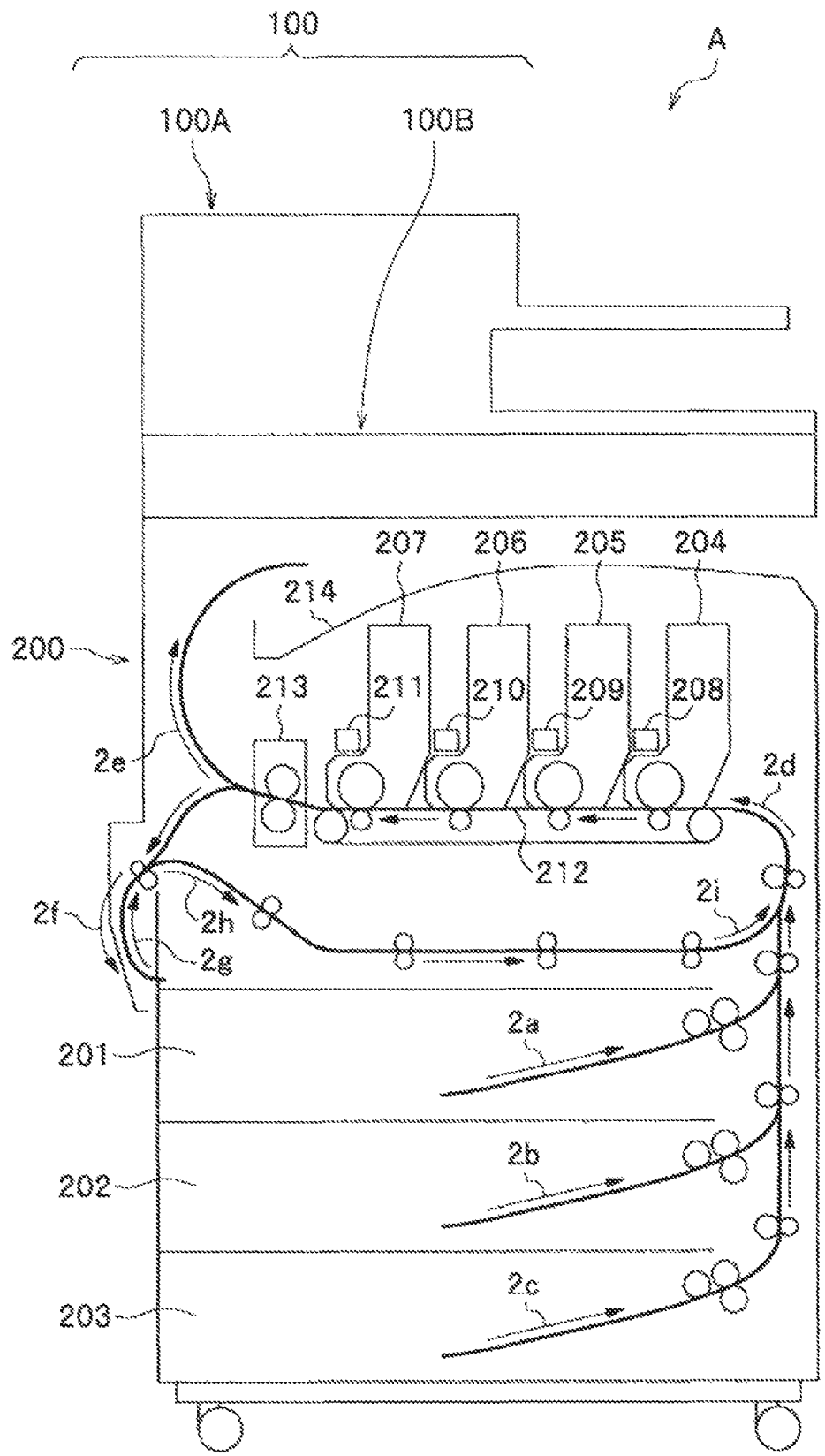
FIG. 1 is an explanatory view of a general configuration of a multifunctional periphery (MFP) having an image scanning apparatus according to a first embodiment.

Descriptions are provided herein-below for embodiments based on the drawings. In the respective drawings referenced herein, the same constituents are designated by the same reference numerals and duplicate explanation concerning the same constituents is omitted. All of the drawings are provided to illustrate the respective examples only.

Embodiments of the invention will be described with reference to the drawings. FIG. 1 is an explanatory view of the general configuration of a multifunctional periphery (MFP) having an image scanning apparatus according to a first embodiment.

First Embodiment

Multifunctional periphery (MFP) A includes image scanning apparatus 100 and image forming apparatus 200. Image scanning apparatus 100 includes automatic document feeder 100A serving as an automatic media feeder and scanning unit 100B.

As shown in FIG. 1, image forming apparatus 200 such as a printer includes first print sheet tray 201 to third print sheet tray 203, four development units 204 to 207, LED heads 208 to 211 serving as exposure units for development unit 204 to 207, a transfer unit having transfer belt 212, fixing unit 213, stacker cover 214, and plural rollers. Note that print sheet trays 201 to 203 are configured to contain print media (for example, paper sheets) therein and may contain print media of different sizes, respectively. Development unit 204 has a black toner cartridge attached thereto containing black (K) toner, development unit 205 has a yellow toner cartridge attached thereto containing yellow (Y) toner, development unit 206 has a magenta toner cartridge attached thereto containing magenta (M) toner, and development unit 207 has a cyan toner cartridge attached thereto containing cyan (C) toner. Stacker cover 214 of this embodiment is of a face-down type.

Next, a developing process of image forming apparatus 200 will be described. Upon receiving a print instruction, the print medium of an appropriate size is fed from one of print sheet trays 201 to 203 in the direction of arrow 2a, 2b, or 2c, and conveyed to transfer belt 212 along the direction of arrow 2d. LED heads 208 to 211 emit light to the surfaces of photosensitive drums of development units 204 to 207 to form electrostatic latent images on the photosensitive drums, respectively. The electrostatic latent images on the photosensitive drums are developed by the toners supplied from the toner cartridges, thereby forming respective color toner images on the photosensitive drums. The color toner images on photosensitive drums are in turn transferred to the print medium that is conveyed on transfer belt 212 by means of the transfer unit, thereby forming a multi-color toner image on the print medium. The medium having the multi-color toner image is conveyed to fixing unit 213, which in turn fixes the multi-color toner image on the print medium, thereby obtaining the print medium whose front side (first side) is printed. In the case of a single-side print operation, the print medium whose one side is printed is discharged onto stacker cover 214 along a direction of arrow 2e. On the other hand, in the case of a double-side print operation, the print medium whose one side is printed is conveyed along arrows 2f to 2h to be turned over, and then the other side of the print medium is printed by development units 204 to 207 and fixing unit 213. Note that when the document sheet P is discharge onto stacker cover 214, the front side (the first side) of the print medium, which faced upward in print sheet tray 201 to 203, faces upward on stacker cover 214 in the single-side print operation, but faces downward on stacker cover 214 in the double-side print operation.

Next, scanning and printing processes of multifunctional periphery A will be described, assuming that multifunctional periphery A scans an original (document sheets), which has three pages, the first page is on the front side (the first side) of the first document sheet, the second page is on the rear side (the second side) of the first document sheet, and the third page is on the front side (the first side) of the second document sheet, and prints the scanned images of the original on print media.

The original is scanned by scanning sensor 63 serving as an image sensor (see FIG. 2) in scanning unit 100B, and then image data of the scanned images are stored in an unillustrated image storage unit. Based on the image data stored in the image storage unit, image forming apparatus 200 prints the second page of the original on the rear side of a first print medium. Image forming apparatus 200 turns over the first medium by conveying the first print medium along arrows 2*f* to 2*h*, and then prints the first page of the original on the front side of the first print medium. After printing the first page of the original, the first print medium is discharged to stacker cover 214 (along arrow 2*e*) with the printed first page (the front side of the first print medium) facing downward on stacker cover 214. Next, image forming apparatus 200 prints the third page of the original on the rear side of a second print medium, and discharges the second print medium to stacker cover 214 (along arrow 2*e*) with the third page (the rear side of the second print medium) facing downward on stacker cover 214. Therefore, on the stacker cover 214, the print media are collated by pages according to the page order of the original.

Next, image scanning apparatus 100 according to the first embodiment will be described with reference to the drawings. FIG. 2 is a vertical sectional view illustrating the configuration of the image scanning apparatus according to the first embodiment.

Image scanning apparatus 100 is configured to scan images including characters, figures, etc. on original P, and includes document tray 1, feeding device 2, conveyance path 3, document reverse means 4, drive unit 5, scan unit 6, and discharged document tray 7, as shown in FIG. 2.

Document tray 1 as an original stacker, a media stacker, or a document stacker is configured to have document sheets P stacked thereon. Document tray 1 whose medium-placing surface is large enough to have document sheets P stacked thereon is formed in a rectangular-like shape in a planar view. Document tray 1 is provided above discharged document tray 7 and is exposed to the outside of the housing of image scanning apparatus 100. Document sheet presence/absence sensor 1a is provided downstream of document tray 1 in a medium conveyance direction to detect if there is any document sheet in document tray 1.

Feeding device 2 is configured to separate document sheets P in document tray 1 and to sequentially feed document sheets P from document tray 1 into conveyance path 3. Feeding device 2 includes pickup roller 21, separation roller 22, and separation pad 23.

Pickup roller 21 is configured to feed document sheets P from document tray 1 to separation roller 22 and separation pad 23. Pickup roller 21 has a cylindrical shape and is rotatably supported. Pickup roller 21 is provided above document tray 1 such that the outer circumference of pickup roller 21 is in contact with the upper face of document sheet P stacked in document tray 1.

Separation roller 22 has a cylindrical shape and is rotatably supported. Separation pad 23 is provided under separation roller 22 such that the outer circumference of separation roller 22 is in contact with separation pad 23. If plural document sheets P are fed by pickup roller 21 from document tray 1, separation pad 23 applies a friction force to document sheets P except for the upmost document sheet P so as to prevent plural document sheets P from being fed to conveyance path 3. Therefore, the upmost sheet of document sheet P, which is in contact with separation roller 22, is fed into conveyance path 3 by rotation of separation roller 22.

Conveyance path 3 includes first to fifth conveyance paths 31 to 35 and first reverse section 36 (first switchback section).

First conveyance path 31 extends from separation roller 22 to scan unit 6. Provided upstream of first conveyance path 31 is first document detection sensor 31*a* configured to detect the leading and tailing edges of document sheet P separated by separation roller 22 and separation pad 23.

Second conveyance path 32 of the first reverse mechanism diverges from midstream of first conveyance path 31 to connect first conveyance path 31 and first reverse section 36. That is, first reverse section 36 introduces document sheet P from first conveyance path 31 into first reverse section 36. Second conveyance path 32 extends from the diverging point to first switchback roller unit 41.

At the diverging point between first conveyance path 31 and second conveyance path 32, first switching member 37 or a first switcher is provided. First switching member 37 is controlled by an unillustrated controller to switch between paths to guide document sheet P from the diverging point to scan unit 6 along the downstream section of first conveyance path 31 or to first reverse section 36 along second conveyance path 32. That is, first switching member 37 is capable of guiding document sheet P to scan unit 6 by blocking second conveyance path 32 and capable of guiding document sheet P to second conveyance path 32 by blocking first conveyance path 31. First switching member 37 is rotatably supported and is formed with an engagement portion to be engaged with unillustrated stoppers. The stoppers are provided at the housing of the apparatus and are configured to engage with first switching member 37 at predetermined positions to stop the rotations of first switching member 37. That is, the rotation of first switching member 37 is stopped at the predetermined position with the stopper contacting with first switching member 37 as torque limiter 52 blocks a transmission of the rotational torque to first switching member 37.

First reverse section 36 of the first reverse mechanism functions to turn over document sheet P before scanning document sheet P. First reverse section 36 is provided above first conveyance path 31 and continuously connects to second conveyance path 32. An end of first reverse section 36 is exposed to the outside of the housing of the apparatus, so that the switchback process (the process of reversing document sheet P) can be favorably executed even though the length of document sheet P in the conveying direction is greater than the length of first reverse section 36 in the conveying direction.

Third conveyance path 33 of the first reverse mechanism diverges from midstream of second conveyance path 32 and is configured to introduce document sheet P that is conveyed from first reverse section 36 via second conveyance path 32 into the downstream portion of first conveyance path 31 toward scan unit 6. That is, third conveyance path 33 extends from a diverging point of second conveyance path 32 and third conveyance path 33 to a converging point of first conveyance path 31 and third conveyance path 33.

Fourth conveyance path 34 is continuously connected to the downstream end of first conveyance path 31 via scan unit 6 and extends from the downstream end of scan unit 6 to discharged document tray 7. Fourth conveyance path 34 includes normal conveyance section 34a, which continuously extends from the downstream end of scan unit 6 to a diverging point to fifth conveyance path 35, and second reverse section 34b (second switchback section), which continuously extends from the downstream end of normal conveyance section 34a (the diverging point to fifth conveyance path 35) to discharged document tray 7.

Fifth conveyance path 35 of a second reverse mechanism (a discharge/reverse mechanism) diverges from midstream of fourth conveyance path 34 (the boundary between normal conveyance section 34a and second reverse section 34b). Fifth conveyance path 35 functions to guide (refeed) document sheet P that is returned from second reverse section 34b by later-described second switchback roller unit 42 into the downstream portion of first conveyance path 31 toward scan unit 6. Fifth conveyance path 35 extends from the diverging point of fourth conveyance path 34 and fifth conveyance path 35 to a converging point of first conveyance path 31 and fifth conveyance path 35.

At the diverging point of fourth conveyance path 34 and fifth conveyance path 35, second switching member 38 or a second switcher is provided. Second switching member 38 functions to switch between a path (second reverse section 34b) from the diverging point to discharged document tray 7 and a path (fifth conveyance path 35) from the diverging point to the downstream portion of first conveyance path 31. Second switching member 38 blocks normal conveyance section 34a of fourth conveyance path 34 by its weight. When document sheet P is conveyed from the downstream end of scan unit 6, second switching member 38 is lifted by conveyed document sheet P to allow conveyed document sheet P to go to second switchback roller unit 42. After the tailing edge of conveyed document sheet P passes through second switching member 38, second switching member 38 returns its initial position by its weight to block normal conveyance section 34a of fourth conveyance path 34. When document sheet P is reversed by second switchback roller unit 42 to be conveyed from second reverse section 34b toward fifth conveyance path 35, document sheet P is favorably introduced into fifth conveyance path 35 by second switching member 38 since second switching member 38 blocks normal conveyance section 34a of fourth conveyance path 34.

Document reverse means 4 includes first switchback roller unit 41 and second switchback roller unit 42.

First switchback roller unit 41, serving as a first document reverse means of the first reverse mechanism, is configured to send document sheet P from second conveyance path 32 into first reverse section 36 and to send document sheet P from first reverse section 36 to third conveyance path 33 by the switchback operation. First switchback roller unit 41 is provided at the boundary of second conveyance path 32 and first reverse section 36 and includes first switchback roller 41a (or first driving roller 41a) and first pressure roller 41b.

First switchback roller 41a is supported to be rotatable in forward and reverse rotational directions and is connected to first conveyance motor 51 of drive unit 5 via an unillustrated drive transmission. When first switchback roller 41a is driven to rotate in a clockwise direction, document sheet P is conveyed from second conveyance path 32 to first reverse section 36. When first switchback roller 41a is driven to rotate in a counterclockwise direction, document sheet P is conveyed from first reverse section 36 to third conveyance path 33.

First pressure roller 41b is provided opposed to first switchback roller 41a and is biased against first switchback roller 41a by an unillustrated biasing member. That is, first pressure roller 41b functions to press document sheet P that is passing between first pressure roller 41b and first switchback roller 41a against first switchback roller 41a while being rotationally driven by first switchback roller 41a.

Second switchback roller unit 42 of the second reverse mechanism serves as a document discharging device to discharge document sheet P that is conveyed from scan unit 6 to discharged document tray 7 and also serves as a second reversing device to refeed document sheet P that is conveyed from scan unit 6 back to scan unit 6 via fifth conveyance path 35 by executing the switchback operation. Second switchback roller unit 42 is provided at the downstream end of fourth conveyance path 34 (near the entrance of discharged document tray 7) and includes second switchback roller 42a (second driving roller 42a) and second pressure roller 42b.

Second switchback roller 42a is supported to be rotatable in forward and reverse rotational directions and is connected to second conveyance motor 53 of drive unit 5 via an unillustrated drive transmission. When second switchback roller 42a is driven to rotate in a counterclockwise direction, document sheet P is conveyed from fourth conveyance path 34 to fifth conveyance path 35. When second switchback roller 42a rotates a clockwise direction, document sheet P is discharged from fourth conveyance path 34 to discharged document tray 7.

Second pressure roller 42b is provided opposed to second switchback roller 42a and is biased against second switchback roller 42a by an unillustrated biasing member. That is, second pressure roller 42b functions to bias document sheet P that is passing between second pressure roller 42b and second switchback roller 42a against second switchback roller 42a while being driven by second switchback roller 42a to rotate.

Drive unit 5 includes first conveyance motor 51 serving as a first driving device, torque limiter 52, second conveyance motor 53 serving as a second driving device, electromagnetic clutch 54, and one-way mechanism 55.

First conveyance motor 51 functions to apply a driving force (rotational torque) to first switchback roller 41a of first switchback roller unit 41, scan roller 8a of scan roller unit 8 serving as a conveying device, and first switching member 37. First switchback roller unit 41 and scan roller unit 8 are connected with each other via an unillustrated drive transmission such that first switchback roller unit 41 and scan roller unit 8 convey document sheet P at approximately the same conveyance speed.

Torque limiter 52 is provided between first conveyance motor 51 and first switching member 37 and functions, when a torque between first conveyance motor 51 and first switching member 37 exceeds a predetermined value, to block the transmission of the torque. That is, torque limiter 52 spins free when a first force received from first conveyance motor 51 is larger than a second force received from first switching member 37, that is, when the engagement portion of first switching member 37 contacts with the stopper. First switching member 37 is fixed at a predetermined position when the engagement portion of first switching member 37 contacts with the stopper and torque limiter 52 blocks the transmission of the torque from first conveyance motor 51 to first switching member 37.

Second conveyance motor 53 functions to apply a driving force (rotational torque) to second switchback roller 42a of second switchback roller unit 42, pickup roller 21, and separation roller 22. Second switchback roller unit 42, pickup roller 21, and separation roller 22 are connected to one another via an unillustrated drive transmission.

Electromagnetic clutch 54 or a clutch means is provided between second conveyance motor 53 and pickup roller 21 and separation roller 22. In this embodiment, when electromagnetic clutch 54 is energized, the driving force of second conveyance motor 53 is transmitted to pickup roller 21 and separation roller 22.

One-way mechanisms 55 are respectively provided at pickup roller 21 and separation roller 22. One-way mechanism 55 functions, when an unillustrated driving shaft of pickup roller 21 or separation roller 22 is fixed not to rotate, to cause pickup roller 21 or separation roller 22 to spin free in the clockwise direction, which is a direction for conveying document sheet P toward the downstream.

Scan unit 6 of scanning unit 100B is provided at scanning position 6a between first conveyance path 31 and fourth conveyance path 34 and functions to scan (read) the image including characters, figures, etc. on document sheet P. Scan unit 6 is exposed to the inside of the housing through an opening provided at the bottom of the housing. Scan unit 6 includes platen glass 61 and scanning sensor 63.

Platen glass 61 functions to allow light that is emitted from an unillustrated light source to document sheet P and then reflected from document sheet P to transmit therethrough, such that the size of the transmitted light is reduced. Paper guide 62 is provided above platen glass 61 and is opposed to platen glass 61. Paper guide 62 functions to bias, against platen glass 61, document sheet P that is passing between paper guide 62 and platen glass 61. Scanning sensor 63 or an image sensor is opposed to paper guide 62 with platen glass 61 therebetween and functions to receive the reflected light that travels through platen glass 61 and to execute a photoelectric conversion to output an electric signal as an image signal.

Scan roller unit 8 and second document detection sensor 9, serving as a second detector, are provided in the downstream portion of first conveyance path 31 (in the vicinity of scan unit 6).

Scan roller unit 8 functions to convey document sheet P toward scan unit 6 at a constant speed. Scan roller unit 8 includes third driving roller 8a (scan roller 8a) and third pressure roller 8b. Scan roller 8a is supported to be rotatable in forward and reverse rotational directions and is connected to first conveyance motor 51 of drive unit 5 via an unillustrated drive transmission. When scan roller 8a is driven to rotate in the counterclockwise direction, document sheet P is conveyed toward scan unit 6.

Third pressure roller 8b is provided opposed to scan roller 8a. Third pressure roller 8b is biased toward scan roller 8a by an unillustrated biasing member. That is, third pressure roller 8b functions to bias document sheet P that is passing between third pressure roller 8b and scan roller 8a against scan roller 8a, while being driven to rotate by scan roller 8a.

Second document detection sensor 9 is provided between scan roller unit 8 and scan unit 6 and functions to detect whether there is a document sheet P passing thereby. When second document detection sensor 9 detects the leading edge of document sheet P, the controller controls, based on the detection result, scan unit 6 to start scanning document sheet P when document sheet P is conveyed by a predetermined amount after the detection of the leading edge of document sheet P.

Discharged document tray 7 serving as a discharged document stacker or a discharged media stacker functions to stack thereon document sheet P that is discharged from conveyance path 3. Discharged document tray 7 has a rectangular shape in a planar view and has a media-placing surface (the bottom surface) large enough to have document sheet P stacked thereon. Discharged document tray 7 is disposed under document tray 1 and exposed to the outside of the housing.

Note that image scanning apparatus 100 includes the controller connected to first conveyance motor 51, second conveyance motor 53, electromagnetic clutch 54, and the sensors. The controller controls activating and deactivating first conveyance motor 51, second conveyance motor 53, and electromagnetic clutch 54 and controls the scanning process based on detection results of the sensors.

Image scanning apparatus 100 of the first embodiment will be further described in detail, referring to FIG. 3 which is an explanatory view of the configuration of image scanning apparatus 100 of the first embodiment.

As shown in FIG. 3, first switchback roller unit 41, second switchback roller unit 42, and conveyance paths 31 to 35 are arranged such that the formula "L1>L2+L3" is satisfied, where L1 (mm) represents the length of a looped path from second switchback roller unit 42 as a start point through fifth conveyance path 35, scan unit 6, and fourth conveyance path 34 to second switchback roller unit 42 as an end point, L2 (mm) represents the length of a path from the diverging point of first conveyance path 31 and second conveyance path 32 as a start point to first switchback roller unit 41 as an end point, and L3 (mm) represents the length of a path from first switchback roller unit 41 as a start point to the converging point of first conveyance path 31 and third conveyance path 33 as an end point.

Next, a document conveyance procedure upon scanning double-sides of document sheet P will be described with reference to FIGS. 4A to 6A. FIGS. 4A to 6A are explanatory views of the document conveyance procedure in a double-side scanning operation of image scanning apparatus 100 of the first embodiment.

First, when the controller receives an instruction to scan both sides of document sheets P, the controller energizes electromagnetic clutch 54 and drives first conveyance motor 51 and second conveyance motor 53 to rotate in the clockwise direction (see FIG. 2). With this operation, first switchback roller 41a, scan roller 8a, and first switching member 37, which are connected to first conveyance motor 51 rotating in the clockwise direction, rotate in the clockwise direction (see FIG. 4A) and then first switching member 37 is stopped by the stopper at the position where first switching member 37 blocks first conveyance path 31. Also, pickup roller 21, separation roller 22, and second switchback roller 42a, which are connected to second conveyance motor 53 rotating in the clockwise direction, rotate in the clockwise direction (see FIG. 4A) and thus the clockwise rotation of pickup roller 21 feeds document sheet P from document tray 1 toward separation roller 22 and separation pad 23 (see FIG. 4A).

Figure 4A:
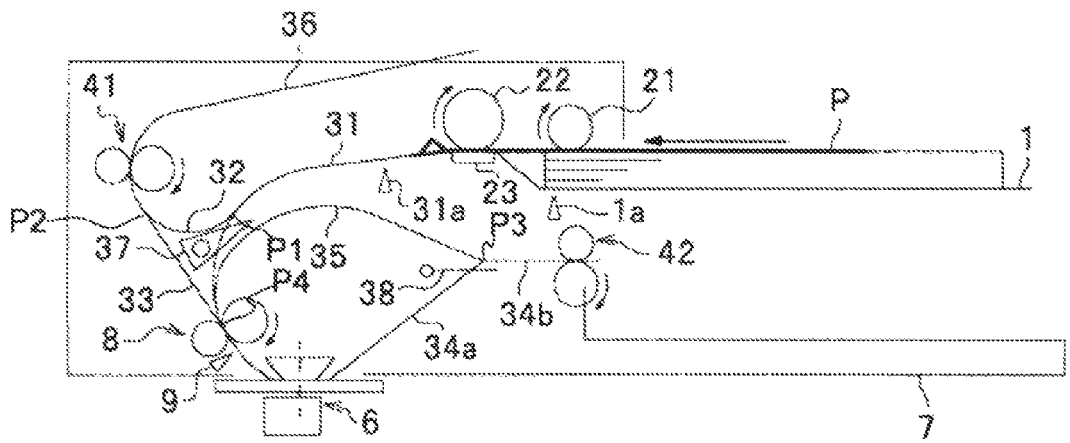
FIGS. 4A to 4C are explanatory views of the document conveyance procedure in a double-side scan operation of the image scanning apparatus according to the first embodiment.
Figure 4B:
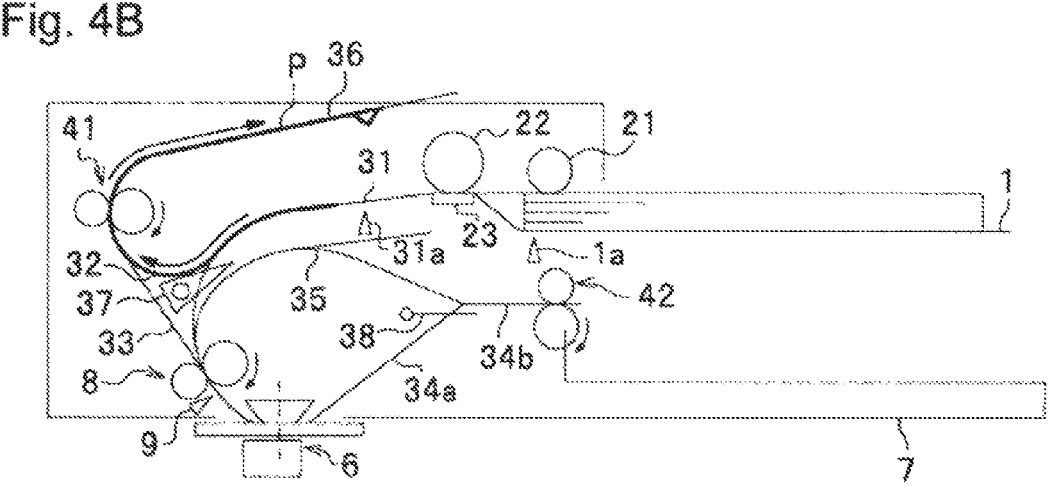

Next, if more than one document sheets P enter between separation roller 22 and separation pad 23, only the topmost sheet of document sheets P is separated from the others and fed to first conveyance path 31 by separation roller 22 and separation pad 23 (see FIG. 4A). Next, document sheet P is detected by first document detection sensor 31a passing above first document detection sensor 31a, serving as a first detector, and then conveyed toward first switching member 37 (see FIG. 4A). Since first switching member 37 blocks first conveyance path 31, document sheet P is conveyed from first conveyance path into second conveyance path 32 and then toward first switchback roller unit 41 along second conveyance path 32 (see FIG. 4B). Here, when first document detection sensor 31a detects the leading edge of document sheet P, the controller controls to convey document sheet P by the predetermine distance until the leading edge of document sheet P reaches first switchback roller unit 41 and the controller controls to de-energize electromagnetic clutch 54 to stop pickup roller 21 and separation roller 22 so as not to feed next document sheet P.

Next, first switchback roller unit 41 conveys document sheet P into first reverse section 36 (see FIG. 4B), since first switchback roller 41*a* rotates in the clockwise direction when document sheet P reaches first switchback roller unit 41. Note that when document sheet P is conveyed by a predetermined amount after first document detection sensor 31*a* detects the tailing edge of document sheet P, the controller temporarily stops first conveyance motor 51 and then reverses first conveyance motor 51 to rotate in the counterclockwise direction. Since first switchback roller 41*a* rotates in the counterclockwise direction, document sheet P is conveyed from first reverse section 36 into third conveyance path 33 (see FIG. 4C). Next, document sheet P in third conveyance path 33 is further conveyed toward scan roller unit 8 along first conveyance path 31 (see FIG. 4C). Since scan roller 8*a* rotates in the counterclockwise direction when document sheet P reaches scan roller unit 8, document sheet P is conveyed toward scan unit 6 by scan roller unit 8 (see FIG. 4C).

Figure 4C:
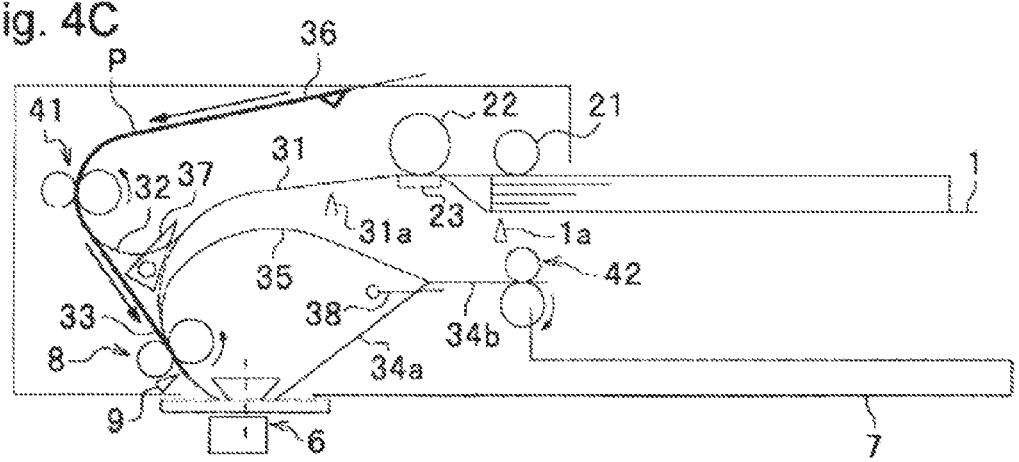
Figure 5A:
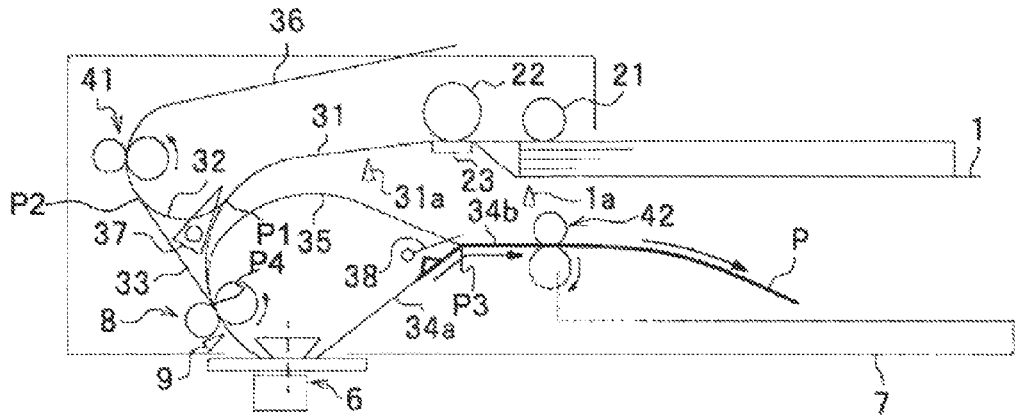
FIGS. 5A to 5C are explanatory views of the document conveyance procedure in the double-side scan operation of the image scanning apparatus according to the first embodiment.
Figure 5B:
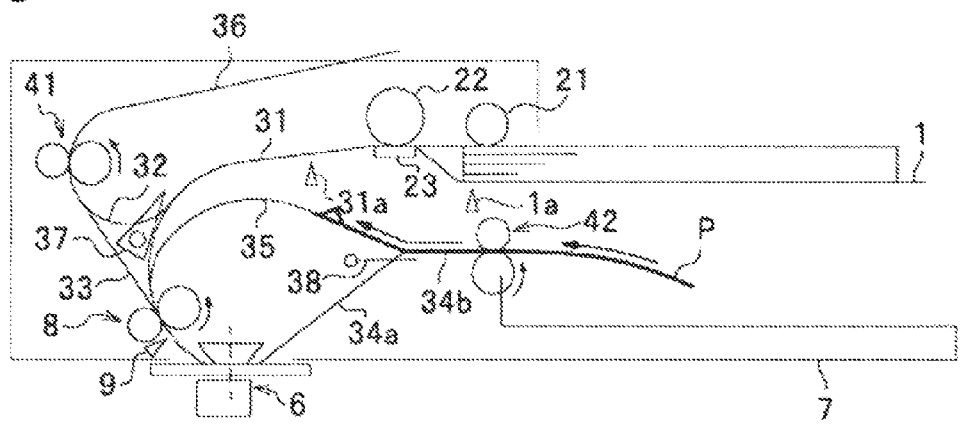
Figure 5C:
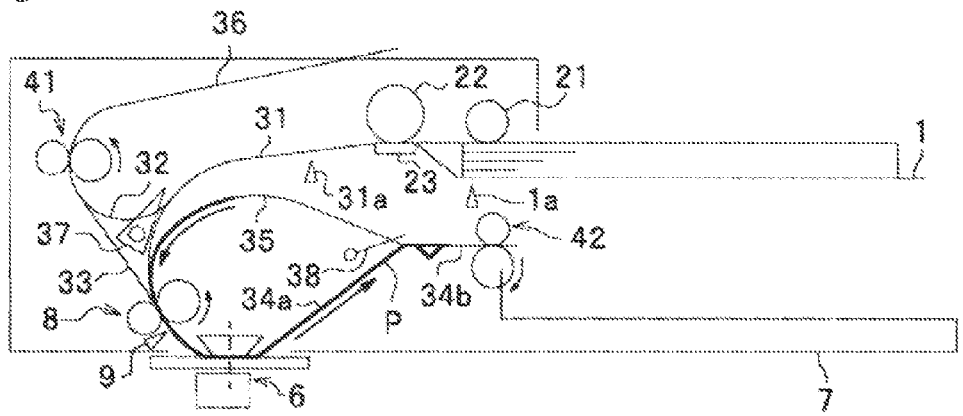

Next, document sheet P that is conveyed toward scan unit 6, passes above, and is detected by second document detection sensor 9 (see FIG. 4C). When document sheet P is conveyed by a predetermined amount after second document detection sensor 9 detects the leading edge of document sheet P, the controller starts the process of scanning document sheet P. Thus, scan unit 6 scans the rear side or the second side of document sheet P, which faced downward in document tray 1 and obtains the image information thereof. Then, document sheet P is conveyed to normal conveyance section 34*a* of fourth conveyance path 34 (see FIG. 5A). Document sheet P conveyed in normal conveyance section 34*a* pushes second switching member 38 out of the way and then is conveyed toward second switchback roller unit 42 along second reverse section 34*b* of fourth conveyance path 34 (see FIG. 5A). When the tailing edge of document sheet P reaches second switchback roller unit 42, first conveyance motor 51 and second conveyance motor 53 are stopped in such a manner that document sheet P is sandwiched by second switchback roller unit 42. Specifically, when document sheet P is conveyed by a predetermined amount after the tailing edge of document sheet P is detected by second document detection sensor 9, the controller ends the process of scanning document sheet P and stops first conveyance motor 51 and second conveyance motor 53.

Next, the controller controls first conveyance motor 51 and second conveyance motor 53 to rotate in the counterclockwise direction. The counterclockwise rotation of second conveyance motor 53 conveys document sheet P, sandwiched by second switchback roller unit 42, from second reverse section 34*b* of fourth conveyance path 34 to fifth conveyance path 35 (see FIG. 5B). At this time, since second switching member 38 blocks normal conveyance section 34*a* of fourth conveyance path 34 due to its weight, document sheet P is favorably conveyed from second reverse section 34*b* of fourth conveyance path 34 to fifth conveyance path 35 (see FIG. 5B). Next, document sheet P in fifth conveyance path 35 is conveyed toward the upstream end of scan roller unit 8 and enters into first conveyance path 31 (see FIG. 5C). Next, since scan roller 8*a* rotates in the counterclockwise direction when document sheet P in first conveyance path 31 reaches scan roller unit 8, document sheet P is conveyed toward scan unit 6 by scan roller unit 8 (see FIG. 5C). Next, document sheet P conveyed toward scan unit 6, passes above second document detection sensor 9, and is detected by second document detection sensor 9 (see FIG. 5C). When document sheet P is conveyed by a predetermined amount after the leading edge of document sheet P is detected by second document detection sensor 9, the controller starts the process of scanning document sheet P.

Next, when document sheet P reaches scan unit 6, scan unit 6 scans the other side of document sheet P, which was stacked facing upward in document tray 1 and obtains its image information. Document sheet P then is conveyed along normal conveyance section 34*a* of fourth conveyance path 34 (see FIG. 5C). Note, when document sheet P is conveyed by a predetermined amount after second document detection sensor 9 detects the tailing edge of document sheet P, the controller ends the scanning process of document sheet P. Next, document sheet P conveyed in normal conveyance section 34*a* of fourth conveyance path 34 pushes second switching member 38 out of the way and then is conveyed toward second switchback roller unit 42 along second reverse section 34*b* of fourth conveyance path 34 (see FIG. 6A). Here, the controller calculates a travel distance (or travel amount) of document sheet P from the start of the scanning process, temporarily stops second conveyance motor 53 just before the leading edge of document sheet P reaches second switchback roller unit 42, and then reverses second conveyance motor 53 to rotate in the clockwise direction.

Figure 6A:
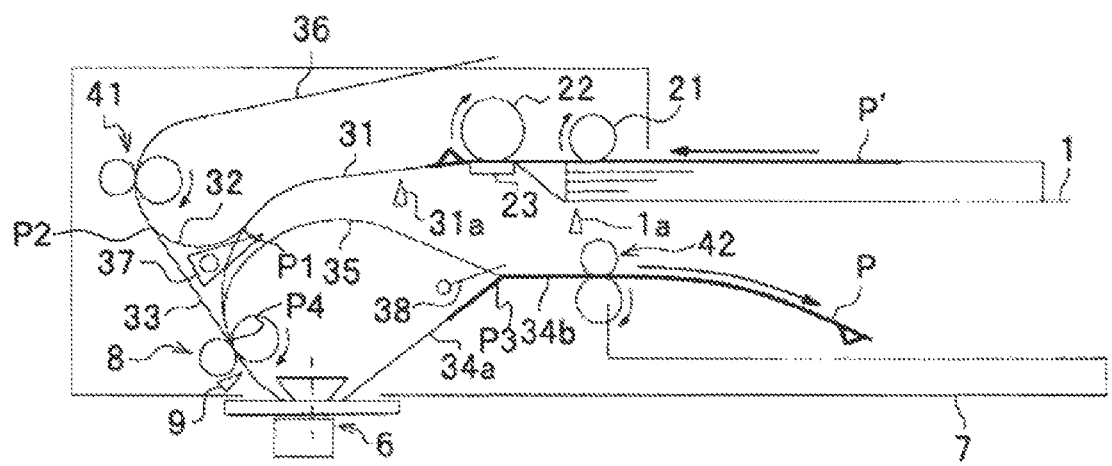
FIG. 6A is an explanatory view of the document conveyance procedure in the double-side scan operation of the image scanning apparatus according to the first embodiment.

Since second switchback roller 42*a* rotates in the clockwise direction when document sheet P reaches second switchback roller unit 42, document sheet P is discharged to discharged document tray 7 (see FIG. 6A).

If next document sheet P' exists in document tray 1, document sheet P is discharged onto discharged document tray 7 while the next document sheet P' is fed from document tray toward separation roller 22 and separation pad 23 by energizing electromagnetic clutch 54. That is, second conveyance motor 53 rotates in the clockwise direction and second switchback roller 42*a*, pickup roller 21, and separation roller 22 thus rotate in the clockwise direction, so as to discharge document sheet P and to feed document sheet P' into first conveyance path 31. Then, the above operation is repeated until no document sheet stacked in document tray 1 is detected. When document presence/absence sensor 1*a* detects no document sheet stacked in document tray 1, the controller controls to convey the last document sheet P by a predetermined amount until the last document sheet P passes through second switchback roller unit 42 and then stops first conveyance motor 51 and second conveyance motor 53, thereby ending the double-side scanning operation.

Figure 7A:
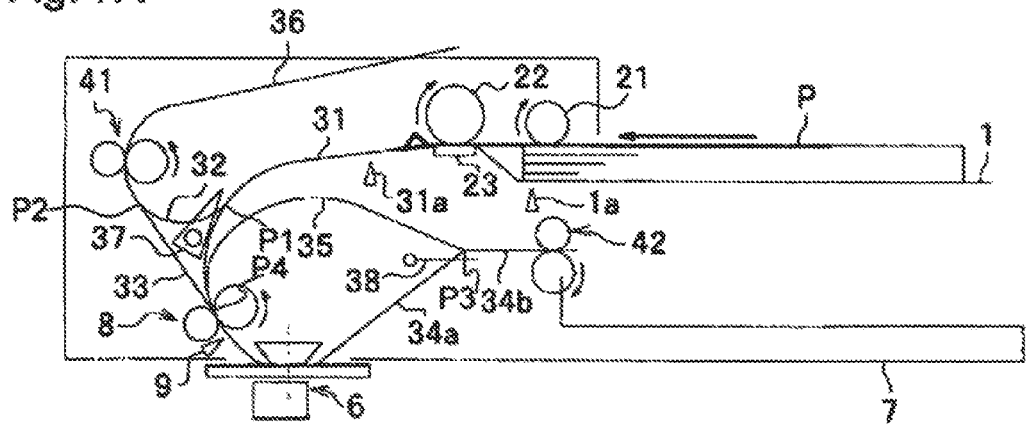
FIGS. 7A to 7C are explanatory views of the document conveyance procedure in the single-side scan operation of the image scanning apparatus according to the first embodiment.

Next, the document conveyance procedure in the single-side scan operation of image scanning apparatus 100 according to the first embodiment will be described with reference to FIGS. 7A to 7C, which illustrates the document conveyance procedure in the single-side scan operation of image scanning apparatus 100.

First, when the controller receives an instruction to scan a single side of document sheet P, the controller energizes electromagnetic clutch 54 and drives first conveyance motor 51 to rotate in the counterclockwise direction and drives second conveyance motor 53 to rotate in the clockwise direction (see FIG. 2). With this operation, first switchback roller 41*a*, scan roller 8*a*, and first switching member 37, which are connected to first conveyance motor 51, rotate in the counterclockwise direction (see FIG. 7A) and then first switching member 37 is stopped by the stopper at the position where first switching member 37 blocks second conveyance path 32. On the other hand, pickup roller 21, separation roller 22, and second switchback roller 42*a*, which are connected to second conveyance motor 53, rotate in the clockwise direction (see FIG. 7A) and thus the clockwise rotation of pickup roller 21 feeds document sheet P from document tray 1 toward separation roller 22 and separation pad 23 (see FIG. 7A).

Next, if more than one document sheets P enter between separation roller 22 and separation pad 23, only topmost document sheet P is separated from the others and fed to first conveyance path 31 by separation roller 22 and separation pad 23 (see FIG. 4A). Next, document sheet P in first conveyance path 31 is detected by first document detection sensor 31a passing above first document detection sensor 31a and then is conveyed toward first switching member 37 (see FIG. 7A). Since first switching member 37 blocks second conveyance path 32, document sheet P is conveyed toward scan roller unit 8 in first conveyance path 31 (see FIG. 7B).

Figure 7B:
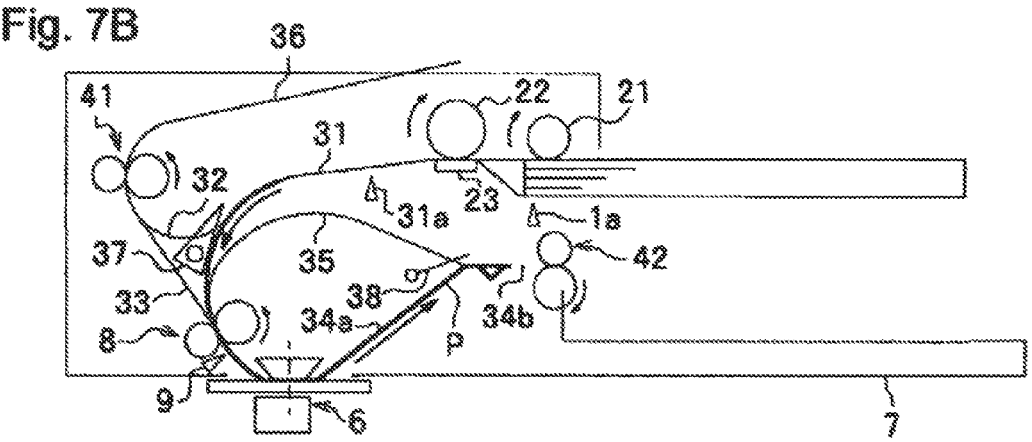
Figure 7C:
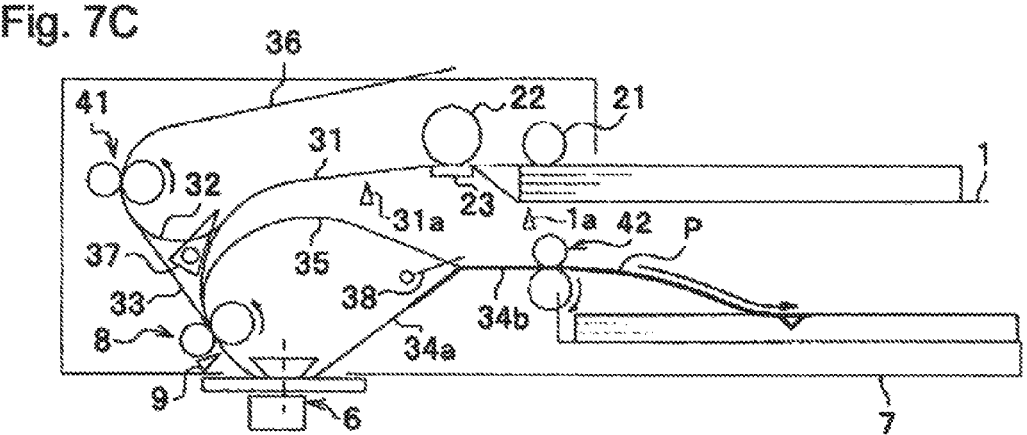

Next, since scan roller 8a rotates in the counterclockwise direction when document sheet P reaches scan roller unit 8, document sheet P is conveyed toward scan unit 6 by scan roller unit 8 (see FIG. 7B). Document sheet P is then detected by second document detection sensor 9 while passing above second document detection sensor 9 (see FIG. 7B). Note that when document sheet P is conveyed by a predetermined amount after second document detection sensor 9 detects the leading edge of document sheet P, the controller starts the process of scanning document sheet P. Thus, scan unit 6 scans a first side or a front side of document sheet P, which faced upward in document tray 1, and obtains the image information thereof. Then, document P is conveyed to normal conveyance section 34a of fourth conveyance path 34 (see FIG. 7B). Document sheet P in normal conveyance section 34a pushes away second switching member 38 and then is conveyed toward second switchback roller unit 42 along second reverse section 34b of fourth conveyance path 34 (see FIG. 7B). Note that when document sheet P is conveyed by a predetermined amount after the tailing edge of document sheet P is detected by second document detection sensor 9, the controller ends the process of scanning document sheet P. Since second switchback roller 42a rotates in the clockwise direction when document sheet P reaches second switchback roller unit 42, document sheet P is discharged to discharged document tray 7 (see FIG. 7C).

Note that when second document detection sensor 9 detects the tailing edge of document sheet P, the controller determines whether there is any document sheet P in document tray 1 based on the detection result of document presence/absence sensor 1a. If it is determined that there is still one or more document sheets P in document tray 1, the controller keeps first conveyance motor 51 and second conveyance motor 53 rotating and keeps electromagnetic clutch 54 energized. The above operation is repeated until no document sheet P in document tray 1 is detected. If it is determined that there is no document sheet P in document tray 1, the controller stops first conveyance motor 51 and second conveyance motor 53 and de-energizes electromagnetic clutch 54 after the last document sheet P passes through second switchback roller unit 42, thereby ending the single-side scanning operation.

In this embodiment, the gear ratio is set such that the rotation speeds of pickup roller 21 and separation roller 22 are less than the rotation speed of second switchback roller unit 42. Therefore, when first conveyance motor 51 and second conveyance motor 53 are driven in such a manner that the rotation speed of scan roller unit 8 is substantially equal to the rotation speed of second switchback roller unit 42, the rotation speeds of pickup roller 21 and separation roller 22 are less than the rotation speed of scan roller unit 8. Consequently, in the single-side scanning operation, when the leading edge of document sheet P is conveyed (sandwiched) by scan roller unit 8 while the tailing edge of document sheet P is conveyed by pickup roller 21 and separation roller 22, the tail of document sheet P is pulled by scan roller unit 8 so that pickup roller 21 and separation roller 22 spin around their drive shafts. When the tailing edge of document sheet P is discharged from pickup roller 21 and separation roller 22, the drive force is transmitted from the drive shaft to pickup roller 21 and separation roller 22, so that the next document sheet P' is fed by pickup roller 21 and separation roller 22. Here, since the rotation speeds of pickup roller 21 and separation roller 22 are set less than the rotation speed of second switchback roller unit 42 in this embodiment, the conveyance speed of the next document sheet P' is kept low before the next document sheet P' reaches scan roller unit 8 to be conveyed. This lengthens the distance between document sheets P and P' so as to maintain the distance appropriately, that is, this prevents document sheets P and P' from contacting with each other in the conveyance procedure.

As described above, according to the first embodiment, document sheet P is conveyed from document tray 1 through first conveyance path 31 to second conveyance path 32 and first reverse section 36, reversed in first reverse section 36, conveyed from first reverse section 36 through third conveyance path 33 and first conveyance path 31 to scan unit 6, and then scanned by scan unit 6. Thus, the rear side (the second side) of document sheet P, which was stacked facing downward in document tray 1, is first scanned, as the front side (the first side) of the document, which was stacked facing upward in document tray 1, faces upward in scan unit 6. Next, document sheet P whose rear side was scanned is conveyed from scan unit 6 through normal conveyance section 34a of fourth conveyance path 34 to second reverse section 34b, reversed (switchbacked) in second reverse section 34b, conveyed from second reverse section 34b through fifth conveyance path 35 and first conveyance path 31 to scan unit 6, and then scanned by scan unit 6. Thus, the front of document sheet P, which was stacked facing upward in document tray 1, is scanned second by scan unit 6 while facing downward in scan unit 6. Therefore, the front side, which was stacked facing upward in document tray 1, faces downward after scanning both sides of document sheet P, and then faces downward in discharged document tray 7. With this operation, the discharged document sheets P in discharged document tray 7 are collated by pages, without further conveying document sheet P through scan unit 6 after both sides of document were scanned, thereby reducing the number of contacts between document sheet P and scan unit 6, minimizing dirt on platen glass 61 of scan unit 6.

Further, according to the first embodiment, the formula "L1>L2+L3" is satisfied, where L1 (mm) represents the length of a looped route from second switchback roller unit 42 as a start point through fifth conveyance path 35, scan unit 6, and fourth conveyance path 34 to second switchback roller unit 42 as an end point, L2 (mm) represents the length of a route from the diverging point of first conveyance path 31 and second conveyance path 32 as a start point to first switchback roller unit 41 as an end point, and L3 (mm) represents the length of a route from first switchback roller unit 41 as a start point to the converging point of first conveyance path 31 and third conveyance path 33 as an end point. Therefore, this structure shortens the total length of the route through which document sheet P passes in the double-side scan operation. In other words, the total length of the route through which document sheet P passes in the double-side scan operation in this embodiment is shorter than that of the related art wherein the document sheet passes through fourth conveyance path 34 and fifth conveyance path 35 twice in a double-side scan operation. Consequently, this structure of the embodiment shortens the time required for the double-side scan operation per document sheet P and thus improves the image scanning efficiency.

Further, in the case where the image scanning apparatus scans both sides of documents P and then image forming apparatus 200 prints the image of both sides of documents P on print media, image forming apparatus 200 first prints the rear side (the second side) of a print medium and then the front side (the first side) of the print medium, in order to collate discharged printed media by pages. Since the first embodiment first scans the rear side (the second side) of document sheet P and then scans the front side (the first side) of document sheet P, the first embodiment is not required to rearrange the page order of the scanned image data of document sheet (s) P. In other words, the first embodiment can reduce the volume of the memory that stores the scanned image data and rearranges the page order of the scanned image data.

Second Embodiment

Next, image scanning apparatus 100 according to a second embodiment of the invention will be described with reference to FIG. 8. Note that FIG. 8 is a vertical sectional view of the general configuration of the image scanning apparatus according to the second embodiment of the invention. In the following description of image scanning apparatus 100 of the second embodiment, the explanation of the same configurations as those of the first embodiment is omitted.

Conveyance path 3 of the second embodiment includes first conveyance path 31 to fourth conveyance path 34 and first reverse section 36.

First conveyance path 31 extends from separation roller 22 to scan unit 6.

Second conveyance path 32 of the first reverse mechanism diverges from an upstream portion of first conveyance path 31 and reversely converges to a midstream portion of first conveyance path 31 and functions to introduce document sheet P from the upstream of first conveyance path 31 through second conveyance path 32 and the midstream of first conveyance path 31 to first reverse section 36. Second conveyance path 32 extends from diverging point P11 from first conveyance path 31 to converging point P12 to first conveyance path 31. The downstream section of second conveyance path 32 inclines upward toward the downstream end of second conveyance path 32. First document sensor 32a is provided in second conveyance path 32, to detect the leading and tailing edges of document sheet P fed by separation roller 22 and separation pad 23.

First switching member 37 (first switcher) of the first reverse mechanism is provided at diverging point P11 of first conveyance path 31 and second conveyance path 32. First switching member 37 is controlled by the controller to switch between first conveyance path 31 (a route from diverging point P11 to scan unit 6) and second conveyance path 32. That is, first switching member 37 functions to block second conveyance path 32 to introduce document sheet P to scan unit 6 or to block first conveyance path 31 to introduce document sheet P to second conveyance path 32.

Third conveyance path 33 is continuously connected to the downstream end of first conveyance path 31 via scan unit 6 and extends from the downstream end of scan unit 6 to discharged document tray 7. Third conveyance path 33 includes normal conveyance section 33a which is from the downstream end of scan unit 6 to diverging point P3 of third conveyance path 33 and fourth conveyance path 34 and second reverse section 33b which is from diverging point P3 of third conveyance path 33 and fourth conveyance path 34 to discharged document tray 7.

Fourth conveyance path 34 of the second reverse mechanism diverges from midstream of third conveyance path 33 and functions to introduce (refeed) document sheet P that is reversed by second switchback roller unit 42 to the upstream portion of first conveyance path 31. Fourth conveyance path 34 is from diverging point P3 of third conveyance path 33 and fourth conveyance path 34 to converging point P14 of fourth conveyance path 34 and first conveyance path 31.

Second switching member 38 (second switcher) of the second reverse mechanism is provided at diverging point P3 of third conveyance path 33 and fourth conveyance path 34. Second switching member 38 functions to block fourth conveyance path 34 to form a route from normal conveyance section 33a via diverging point P3 to second reverse section 33b and functions to block normal conveyance section 33a to form a route from second reverse section 33b via the diverging point to fourth conveyance path 34. Second switching member 38 blocks normal conveyance section 33a of third conveyance path 33 by its weight. Second switching member 38 is pushed away by document sheet P conveyed in normal conveyance section 33a of third conveyance path 33 and allows document sheet P to pass through second switching member 38. After the tailing edge of document sheet P passes through second switching member 38 toward second switchback roller unit 42, second switching member 38 returns to its initial position to block normal conveyance section 33a of third conveyance path 33. When document sheet P is reversed by second switchback roller unit 42, second switching member 38 is in its initial position to block normal conveyance section 33a of third conveyance path 33 and thus introduces document sheet P to fourth conveyance path 34.

First switchback roller unit 41 serving as a first reversing device of the first reverse mechanism is provided in first conveyance path 31. Specifically, first switchback roller unit 41 is provided between diverging point P13 of first conveyance path 31 and first reverse section 36 and converging point P12 of first conveyance path 31 and second conveyance path 32 in first conveyance path 31.

Second switchback roller unit 42 serving as the second reversing device and the document discharging device of second reverse mechanism is provided in the vicinity of the downstream end of third conveyance path 33 (the entrance of discharged document tray 7).

Image scanning apparatus 100 of the second embodiment will be described in further detail with reference to FIG. 9. FIG. 9 is an explanatory view illustrating the configuration of the image scanning apparatus according to the second embodiment.

As shown in FIG. 9, in the second embodiment, second conveyance path 32 is arranged such that the formula "L4>L5" is satisfied, where L4 (mm) represents the length of a looped path from second switchback roller unit 42 as a start point through fourth conveyance path 34, first switchback roller unit 41, scan unit 6, and third conveyance path 33 to second switchback roller unit 42 as an endpoint, and L5 (mm) represents the length of a path from diverging point P11 of first conveyance path 31 and second conveyance path 32 as a start point through second conveyance path 32 to first switchback roller unit 41 as an end point.

Next, the document conveyance procedure in the double-side scan operation according to the second embodiment will be described with reference to FIGS. 10A to 12A. FIGS. 10A to 12A are explanatory views of the document conveyance procedure in the double-side scan operation of the image scanning apparatus according to the second embodiment.

First, when the controller receives an instruction to scan both sides of document sheets P, the controller energizes electromagnetic clutch 54 and then drives first conveyance motor 51 and second conveyance motor 53 to rotate in the clockwise direction (see FIG. 8). With this operation, first switchback roller 41*a* and scan roller 8*a*, which are connected to first conveyance motor 51 rotating in the clockwise direction, rotate in the clockwise direction (see FIG. 10A) and then the rotation of first switching member 37 is stopped by the stopper at the position where first switching member 37 blocks first conveyance path 31. Also, pickup roller 21, separation roller 22, and second switchback roller 42*a*, which are connected to second conveyance motor 53, rotate in the clockwise direction (see FIG. 10A) and thus the clockwise rotation of the pickup roller 21 feeds document sheet P from document tray 1 toward separation roller 22 and separation pad 23 (see FIG. 10A).

Figure 10A:
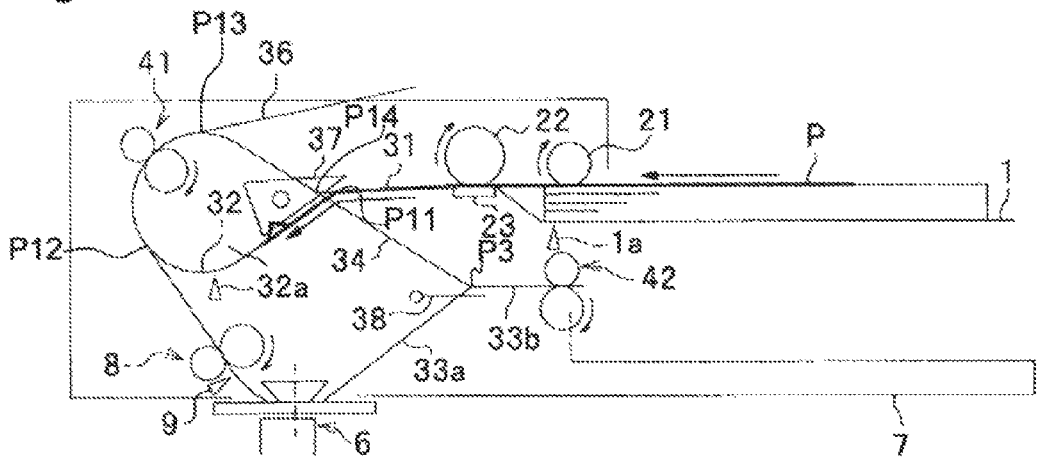
FIGS. 10A to 10C are explanatory views of the document conveyance procedure in a double-side scan operation of the image scanning apparatus according to the second embodiment.

Next, if more than one document sheets P enter between separation roller 22 and separation pad 23, only the topmost sheet of document sheets P is separated from the others and fed into first conveyance path 31 toward first switching member 37 by separation roller 22 and separation pad 23 (see FIG. 10A). Since first switching member 37 blocks first conveyance path 31, document sheet P is conveyed from first conveyance path 31 into second conveyance path 32 and then is detected by first document sensor 32*a* while passing above first document sensor 32*a* toward first switchback roller unit 41 (see FIG. 10B). Note that when first document sensor 32*a* detects the leading edge of document sheet P, the controller controls to convey document sheet P by a predetermined amount until the leading edge of document sheet P reaches first switchback roller unit 41 and the controller also disenergizes electromagnetic clutch 54 to stop pickup roller 21 and separation roller 22 in order not to feed the next document from document tray 1.

Figure 10B:
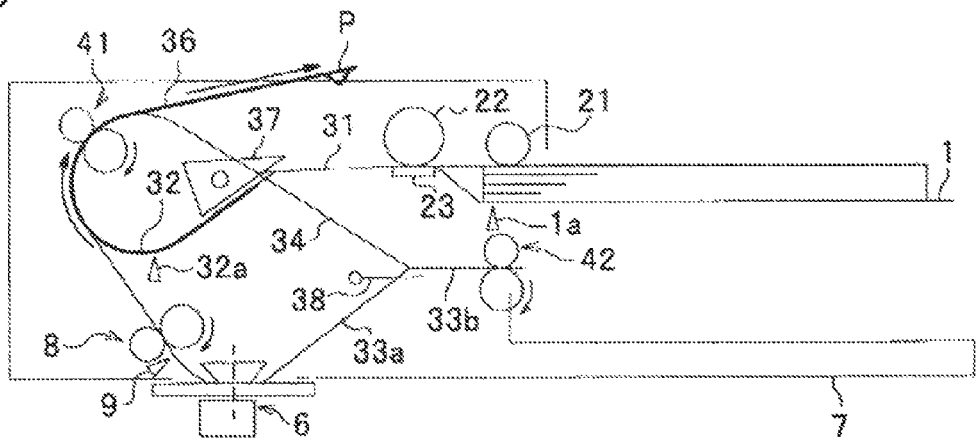

Next, since first switchback roller 41*a* rotates in the clockwise direction when document sheet P reaches first switchback roller unit 41, first switchback roller unit 41 conveys document sheet P to first reverse section 36 (see FIG. 10B). When first document sensor 32*a* detects the tailing edge of document sheet P, the controller controls first conveyance motor 51 to convey document sheet P by a predetermined amount, and temporarily stops first conveyance motor 51 and then reverses first conveyance motor 51 to rotate in the counterclockwise direction. Next, the counterclockwise rotation of the first switchback roller 41*a* conveys document sheet P from first reverse section 36 to scan roller unit 8 along first conveyance path 31 (see FIG. 10C). Next, since scan roller 8*a* rotates in the counterclockwise direction when document sheet P reaches scan roller unit 8, scan roller unit 8 conveys document sheet P to scan unit 6 (see FIG. 10C).

Figure 10C:
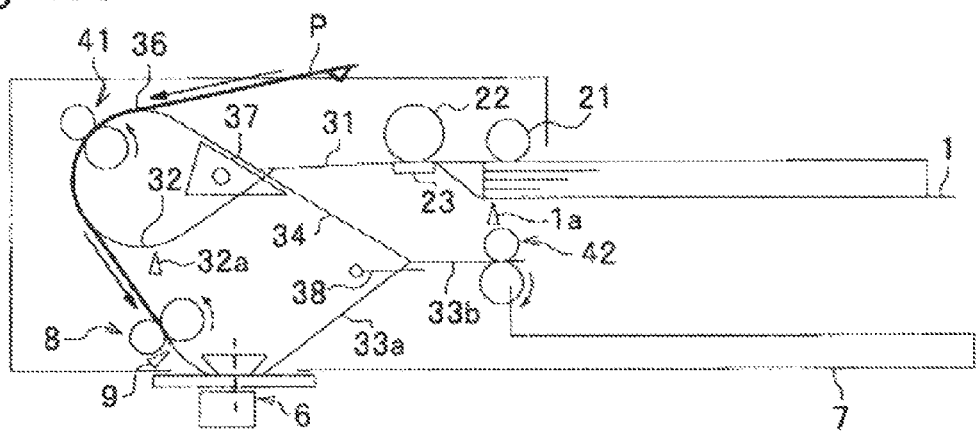

Next, the document is detected by second document detection sensor 9 while passing above second document detection sensor 9 toward scan unit 6 (see FIG. 10C). When second document detection sensor 9 detects the leading edge of document sheet P, the controller controls to convey document sheet P by a predetermined amount and then starts the scanning process. When document P is passing through scan unit 6 toward normal conveyance section 33*a* of third conveyance path 33, scan unit 6 scans the rear side (second side) of document sheet P, which faced downward in document tray 1, to obtain the image information (see FIG. 11A). Document sheet P that is conveyed in normal conveyance section 33*a* of third conveyance path 33 pushes away second switching member 38 and is further conveyed toward second switchback roller unit 42 in second reverse section 33*b* of third conveyance path 33 (see FIG. 11A). When document sheet P reaches second switchback roller unit 42, the controller stops first conveyance motor 51 and second conveyance motor 53 in such a manner that the tailing edge of document sheet P is sandwiched by second switchback roller unit 42. Specifically, when document sheet P is conveyed by a predetermined amount after second document detection sensor 9 detects the tailing edge of document sheet P, the controller ends the scanning process and stops first conveyance motor 51 and second conveyance motor 53.

Next, the controller drives first conveyance motor 51 and second conveyance motor 53 to rotate in the counterclockwise direction. With this, document sheet P that is sandwiched by second switchback roller unit 42 is conveyed from second reverse section 33*b* of third conveyance path 33 to fourth conveyance path 34 (see FIG. 11B). Since second switching member 38 blocks normal conveyance section 33*a* of third conveyance path 33 by its weight, document sheet P is favorably conveyed from second reverse section 33*b* of third conveyance path 33 into fourth conveyance path 34 (see FIG. 11B). Then, document sheet P is conveyed from fourth conveyance path 34 into first conveyance path 31 toward the upstream side of scan roller unit 8 (see FIG. 11C). Since scan roller 8*a* rotates in the counterclockwise direction when document sheet P reaches scan roller unit 8 in first conveyance path 31, scan roller unit 8 conveys document sheet P to scan unit 6 (see FIG. 11C). Next, document sheet P that is conveyed toward scan unit 6 by scan roller unit 8 is detected by second document detection sensor 9 while passing above second document detection sensor 9 (see FIG. 11C). When document sheet P is conveyed by a predetermined amount after second document detection sensor 9 detects the leading edge of document sheet P, the controller starts the document scanning process.

Figure 11A:
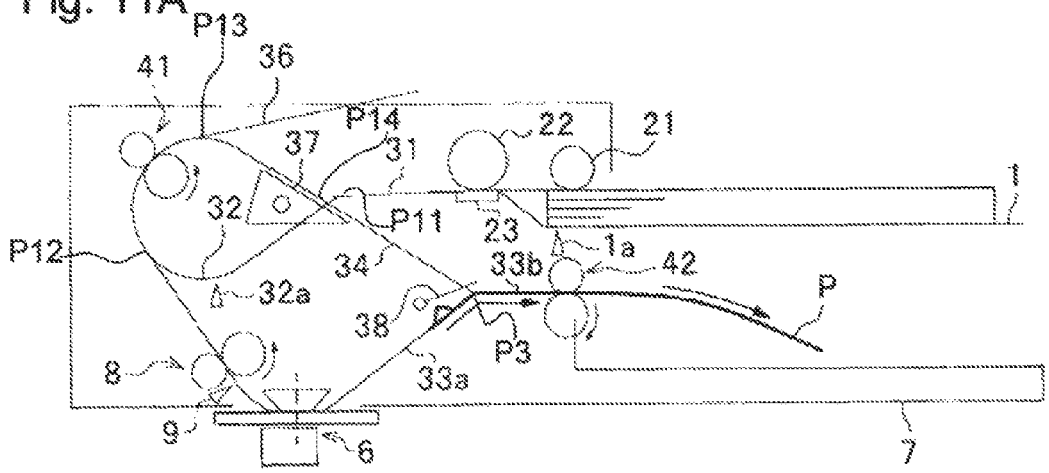
FIGS. 11A to 11C are explanatory views of the document conveyance procedure in the double-side scan operation of the image scanning apparatus according to the second embodiment.
Figure 11B:
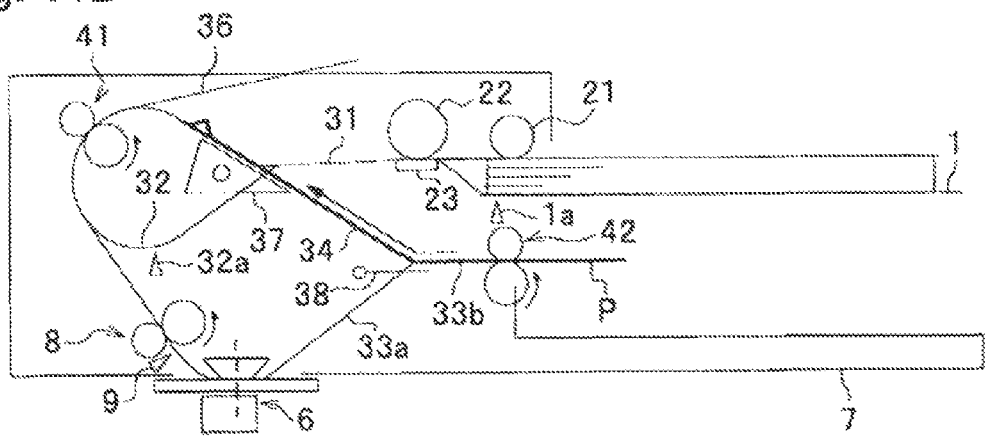
Figure 11C:
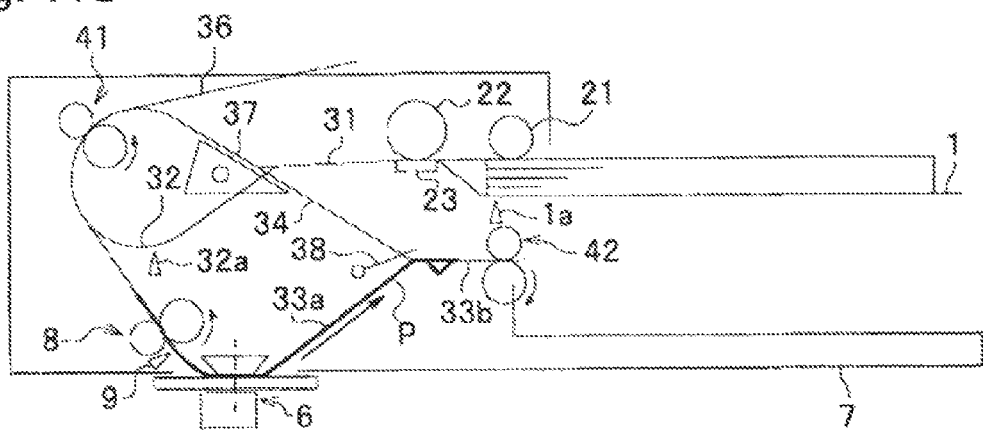

When document sheet P is passing through scan unit 6 toward normal conveyance section 33*a* of third conveyance path 33, scan unit 6 scans the side of document sheet P, which faced upward in document tray 1, to obtain the image information (image data) thereof (see FIG. 11C). Note that when document sheet P is conveyed by a predetermined amount after second document detection sensor 9 detects the tailing edge of document sheet P, the controller ends the document scanning process. Next, document sheet P is conveyed in normal conveyance section 33*a* of third conveyance path 33 while pushing away second switching member 38 and then further conveyed into second reverse section 33*b* of third conveyance path 33 toward second switchback roller unit 42 (see FIG. 12A). Here, the controller calculates a travel distance (or a travel amount) of document sheet P from the start of the scanning process, stops second conveyance motor 53 just before the leading edge of document sheet P reaches second switchback roller unit 42, and then reverses second conveyance motor 53 to rotate in the clockwise direction.

Next, since second switchback roller 42*a* rotates in the clockwise direction when document sheet P reaches second switchback roller unit 42, document sheet P is discharged to discharged document tray 7 (see FIG. 12A).

Note that the controller determines if the next document sheet P' exists in document tray 1 based on the detection of document presence/absence sensor 1*a*. When document presence/absence sensor 1*a* detects the next document sheet P' in document tray 1, the controller stops first conveyance motor 51 and second conveyance motor 53 right after the scanning process, and energizes electromagnetic clutch 54 and drives first conveyance motor 51 and second conveyance motor 53 to rotate in the clockwise direction, so as to discharge document sheet P to discharged document tray 7 and to feed the next document sheet P' into first conveyance path 31. The above operation is repeated until no document sheet P stacked in document tray 1 is detected. When document presence/absence sensor 1a detects no document sheet in document tray 1, the controller controls to convey document sheet P by a predetermined amount until document sheet P passes through second switchback roller unit 42 and then stops first conveyance motor 51 and second conveyance motor 53, thereby ending the double-side scanning operation.

Figure 13A:
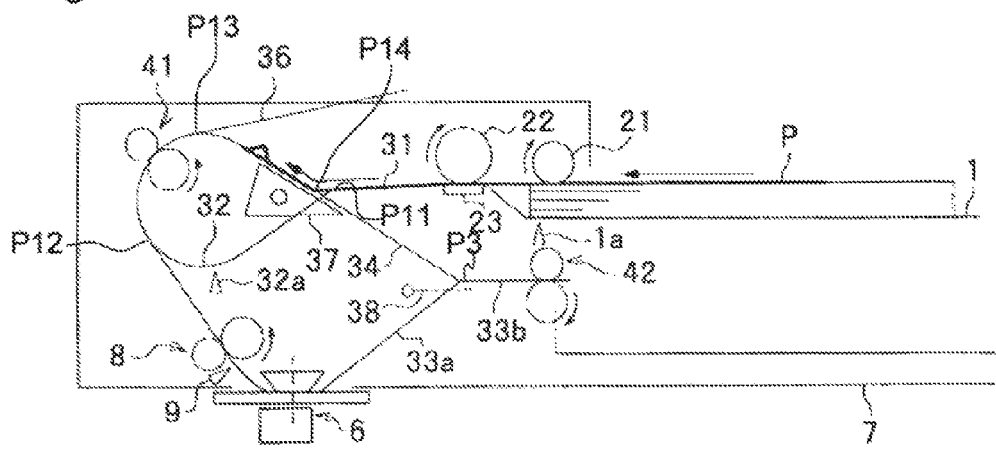
FIGS. 13A to 13C are explanatory views of the document conveyance procedure in the single-side scan operation of the image scanning apparatus according to the second embodiment.
Figure 13B:
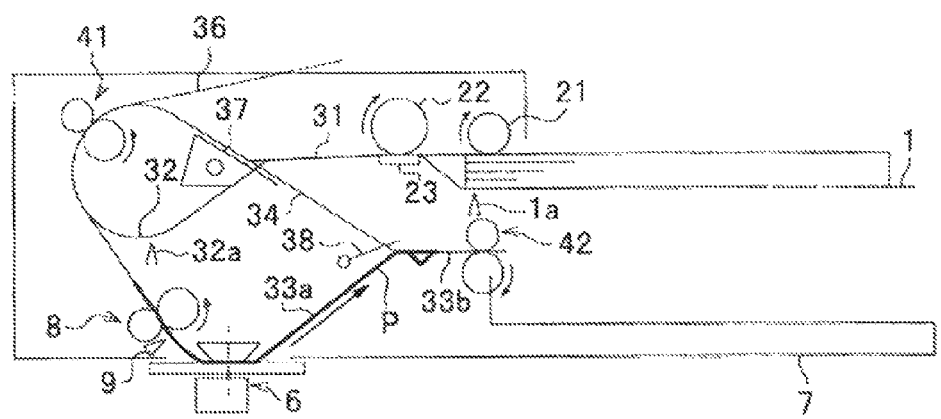
Figure 13C:
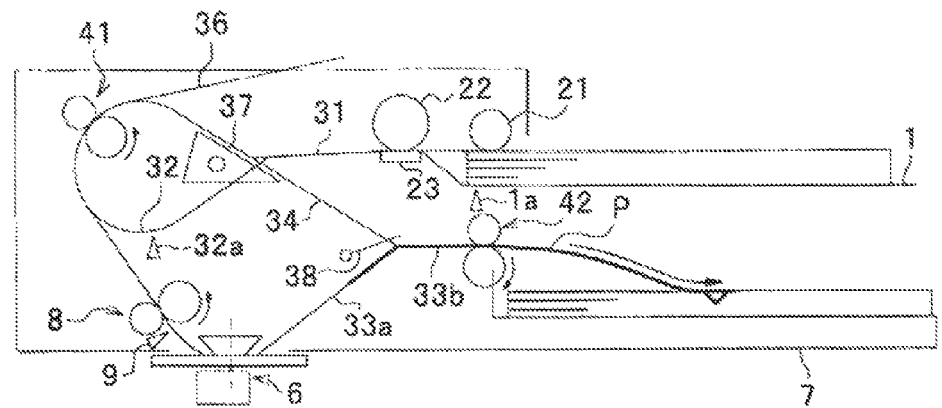

Next, the document conveyance procedure in the single side scanning operation according to the second embodiment will be described with reference to FIGS. 13A to 13C. FIGS. 13A to 13C are explanatory views of the document conveyance procedure in the single-side scan operation of the image scanning apparatus according to the second embodiment.

First, when the controller receives an instruction to scan a single side of document sheets P, the controller energizes electromagnetic clutch 54, and drives first conveyance motor 51 to rotate in the counterclockwise direction and drives second conveyance motor 53 to rotate in the clockwise direction (see FIG. 8). With this operation, first switchback roller 41a and scan roller 8a, which are connected to first conveyance motor 51, rotate in the counterclockwise direction (see FIG. 13A) and then the rotation of first switching member 37 is stopped by the stopper at the position where first switching member 37 blocks second conveyance path 32. Also, pickup roller 21, separation roller 22, and second switchback roller 42a, which are connected to second conveyance motor 53, rotate in the clockwise direction (see FIG. 13A) and thus the clockwise rotation of pickup roller 21 feeds document sheet P from document tray 1 toward separation roller 22 and separation pad 23 (see FIG. 13A).

Next, if more than one document sheets P enter between separation roller 22 and separation pad 23, only the topmost sheet of document sheets P is separated from the others and fed to first conveyance path 31 by separation roller 22 and separation pad 23 (see FIG. 13A). Next, document sheet P is conveyed toward first switching member 37 in first conveyance path 31 (see FIG. 13A). Since first switching member 37 blocks second conveyance path 32, document sheet P is further conveyed toward first switchback roller unit 41 in first conveyance path 31 (see FIG. 13A).

Next, since first switchback roller 41a rotates in the counterclockwise direction when document sheet P reaches first switchback roller unit 41, first switchback roller unit 41 conveys document sheet P to scan roller unit 8 (see FIG. 13B). When document sheet P reaches scan roller unit 8, scan roller 8a rotates in the counterclockwise direction and thus scan roller unit 8 conveys document sheet P to scan unit 6 (see FIG. 13B). Next, document sheet P is detected by second document detection sensor 9 while passing above second document detection sensor 9 toward scan unit 6 (see FIG. 13B). Note that when document sheet P is conveyed by a predetermined amount after second document detection sensor 9 detects the leading edge of document sheet P, the controller starts the document scanning process. When document sheet P is passing through scan unit 6 toward normal conveyance section 33a of third conveyance path 33, scan unit 6 scans the front side (the first side) of document sheet P, which faced upward in document tray 1 to obtain the image information (image data) thereof (see FIG. 13B). Document sheet P is then conveyed from normal conveyance section 33a of third conveyance path 33 into second reverse section 33b of third conveyance path 33 toward second switchback roller unit 42, while pushing away second switching member 38 (see FIG. 13B). Note that when document sheet P is conveyed by a predetermined amount after second document detection sensor 9 detects the tailing edge of document sheet P, the controller ends the document scanning process. Next, since second switchback roller 42a rotates in the clockwise direction when document sheet P reaches second switchback roller unit 42, document sheet P is discharged to discharged document tray 7 (see FIG. 13C).

When second document detection sensor 9 detects the tailing edge of document sheet P, the controller determines if there is any document sheet P stacked in document tray 1 based on the detection of document presence/absence sensor 1a. When the controller determines that one or more document sheets P are stacked in document tray 1, the controller keeps rotating first conveyance motor 51 and second conveyance motor 53 and keeps energizing electromagnetic clutch 54. The above operation is repeated until there is no document sheet P stacked in document tray 1. When the controller determines that no document sheet in document tray 1 is detected, the controller controls to convey document sheet P by a predetermined amount until document sheet P passes through second switchback roller unit 42 and then stops first conveyance motor 51 and second conveyance motor 53, thereby ending the single-side scanning operation.

According to the second embodiment as described above, the second embodiment achieves the same effects as or similar effects to the first embodiment. In the double-side scan operation of the second embodiment, document sheet P that is fed from document tray 1 is conveyed from first conveyance path 31 through second conveyance path 32 to first reverse section 36, reversed at first reverse section 36 to be conveyed to scan unit 6 via first conveyance path 31, and then scanned by scan unit 6. Thus, the rear side of document sheet P, which was stacked facing downward in document tray 1, is first scanned, as the front side of document, which was stacked facing upward in document tray 1, faces upward in scan unit 6. Next, document sheet P whose rear side was scanned is conveyed from scan unit 6 through normal conveyance section 33a of third conveyance path 33 to second reverse section 33b, reversed (switchbacked) at second reverse section 33b to be conveyed through fourth conveyance path 34 and first conveyance path 31 to scan unit 6, and then scanned by scan unit 6. Thus, the front side of document sheet P, which was stacked facing upward in document tray 1, is secondly scanned by scan unit 6 with facing downward in scan unit 6. Therefore, after the both sides of document sheet P was scanned, the front side, which was stacked facing upward in document tray 1, faces downward and then is discharged to discharged document tray 7 facing downward. With this operation, the discharged document sheets P in discharged document tray 7 are collated by pages, without further conveying document sheet P through scan unit 6 after both sides of document was scanned, thereby reducing the number of contacts between document sheet P and scan unit 6, minimizing dirt on platen glass 61 of scan unit 6. Further, according to the second embodiment, the formula "L4>L5" is satisfied, where L4 (mm) represents the length of a looped path from second switchback roller unit 42 as a start point through fourth conveyance path 34, first switchback roller unit 41, scan unit 6, and third conveyance path 33 to second switchback roller unit 42 as an end point, and L5 (mm) represents the length of a path from diverging point P11 of first conveyance path 31 and second conveyance path 32 as a start point through second conveyance path 32 to first switchback roller unit 41 as an end point. Therefore, this structure shortens the total length of the route through which document sheet P passes in the double-side scan operation. Consequently, this structure shortens the time required for the double-side scan operation per document sheet P and thus improves the image scanning efficiency.

Third Embodiment

Next, image scanning apparatus 100 of a third embodiment of the invention will be described with reference to FIG. 14. FIG. 14 is a vertical sectional view of the general configuration of the image scanning apparatus of the third embodiment. Note that in image scanning apparatus 100 of the third embodiment, the explanation of the same configurations as those of the first embodiment is omitted.

In the third embodiment, as shown in FIG. 14, electromagnetic clutch 56, serving as a switching device, is provided between first conveyance motor 51 and first switchback roller unit 41 (first switchback roller 41a). Electromagnetic clutch 56 is configured to transmit the driving force of first conveyance motor 51 to first switchback roller unit 41 (first switchback roller 41a) when electromagnetic clutch 56 is energized.

Next, image scanning apparatus 100 of the third embodiment will be described in further detail with reference to FIG. 15. FIG. 15 is an explanatory view of the configuration of the image scanning apparatus 100 of the third embodiment.

As shown in FIG. 15, pickup roller 21, separation roller 22, scan roller unit 8, first switchback roller unit 41, second switchback roller unit 42, first conveyance path 31, second conveyance path 32, and fourth conveyance path 34 are arranged such that the formula "L7/Vs>L6/Vh" is satisfied, where L6 (mm) represents the length of a route from pickup roller 21 as a start point through separation roller 22, first conveyance path 31, and second conveyance path 32 to first switchback roller unit 41 as an end point, L7 (mm) represents the length of a route from scan roller unit 8 as a start point through scan unit 6 and fourth conveyance path 34 to second switchback roller unit 42 as an end point, Vh (mm/s) represents the circumferential speed of separation roller 22, and Vs (mm/s) represents the circumferential speed of scan roller unit 8.

Next, the document conveyance procedure in the double-side scanning operation according to the third embodiment will be described with reference to FIGS. 16A to 18B. FIGS. 16A to 18B are views for explaining the document conveyance procedure in the double-side scan operation according to the image scanning apparatus of the third embodiment.

First, the controller receives an instruction to scan the both sides of document sheet(s) P, the controller energizes electromagnetic clutch 54 and electromagnetic clutch 56 and then drives first conveyance motor 51 and second conveyance motor 53 to rotate in the clockwise direction (see FIG. 14). Thus, since first conveyance motor 51 rotates in the clockwise direction, first switchback roller 41a, scan roller 8a, and first switching member 37, which are connected to first conveyance motor 51, rotate in the clockwise direction (see FIG. 16A) and then the rotation of first switching member 37 is stopped by the stopper at the position where first switching member 37 blocks first conveyance path 31 (see FIG. 16A). Also, since second conveyance motor 53 rotates in the clockwise direction, pickup roller 21, separation roller 22, and second switchback roller 42a, which are connected to second conveyance motor 53, rotate in the clockwise direction, and thus the clockwise rotation of pickup roller 21 feeds document sheet P from document tray 1 toward separation roller 22 and separation pad 23 (see FIG. 16A).

Figure 16A:
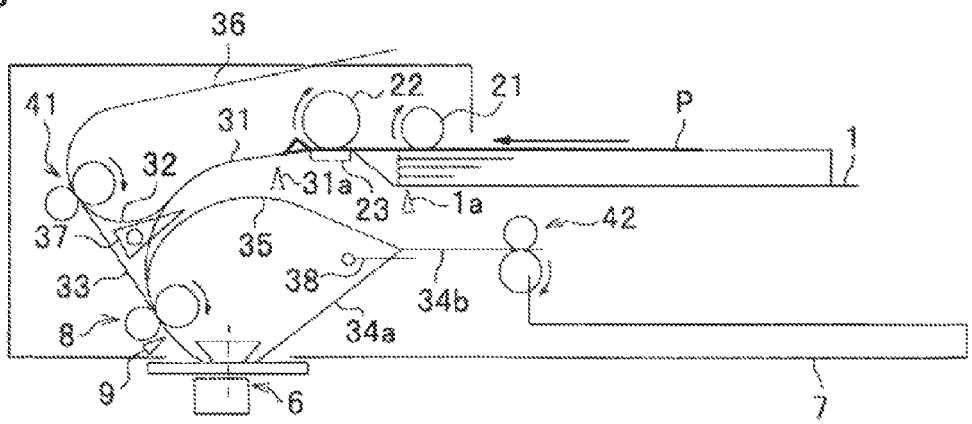
FIGS. 16A to 16C are explanatory views of the document conveyance procedure in the double-side scan operation of the image scanning apparatus according to the third embodiment.

Next, if more than one document sheets P enter between separation roller 22 and separation pad 23, only the topmost sheet of document sheet P is separated from the others and fed to first conveyance path 31 by separation roller 22 and separation pad 23 (see FIG. 16A). Document sheet P that is fed into first conveyance path 31 is detected by first document detection sensor 31a while being conveyed above first document detection sensor 31a toward first switching member 37 (see FIG. 16A). Next, since first switching member 37 blocks first conveyance path 31, document sheet P is conveyed from first conveyance path 31 into second conveyance path 32 toward first switchback roller unit 41 (see FIG. 16A). Note that when first document detection sensor 31a detects the leading edge of document sheet P, the controller controls to convey document sheet P a predetermined amount until the leading edge of document sheet P reaches first switchback roller unit 41 and then de-energizes electromagnetic clutch 54 and stops pickup roller 21 and separation roller 22, in order not to feed the next document from document tray 1 (see FIG. 16B).

Figure 16B:
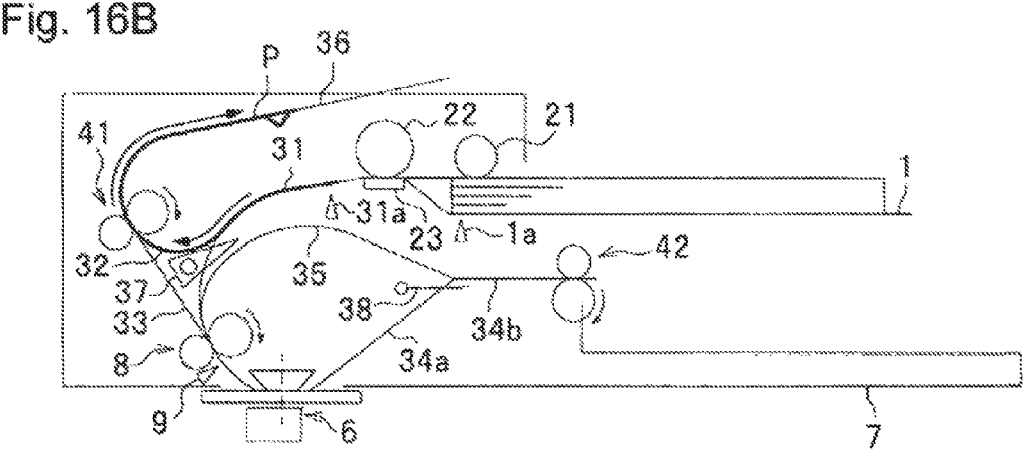

Next, since first switchback roller 41a rotates in the clockwise direction when document sheet P reaches first switchback roller unit 41, first switchback roller unit 41 conveys document sheet P into first reverse section 36 (see FIG. 16B). When first document detection sensor 31a detects the tailing edge of document sheet P, the controller controls to convey document sheet P by a predetermined amount, temporarily stops first conveyance motor 51, and then reverses first conveyance motor 51 to rotate in the counterclockwise direction. Next, since first switchback roller 41a rotates in the counterclockwise direction, document sheet P is conveyed from first reverse section 36 into third conveyance path 33 (see FIG. 16C). Document sheet P that is conveyed in third conveyance path 33 is further conveyed toward scan roller unit 8 in first conveyance path 31 (see FIG. 16C). Next, since scan roller 8a rotates in the counterclockwise direction when document sheet P reaches scan roller unit 8, scan roller unit 8 forwards document sheet P toward scan unit 6 (see FIG. 16C).

Figure 16C:
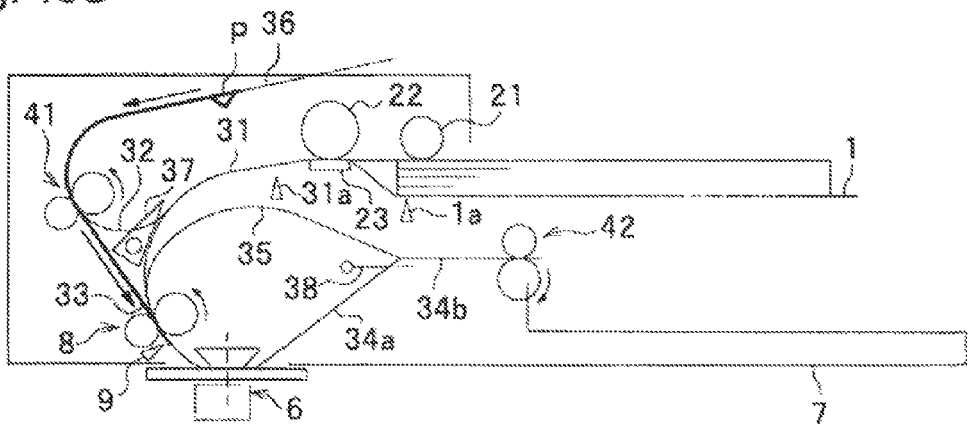

Next, document sheet P is detected by second document detection sensor 9 while passing above second document detection sensor 9 toward scan unit 6 (see FIG. 16C). When second document detection sensor 9 detects the leading edge of document sheet P, the controller controls to convey document sheet P by a predetermined amount and then to start the document scanning process. Next, document sheet P passing through scan unit 6 toward normal conveyance section 34a of fourth conveyance path 34, a second side or a rear side of document sheet P, which was stacked facing downward document tray 1, is scanned to obtain the image information (the image data) of the second side of document sheet P (see FIG. 17A).

When second document detection sensor 9 detects the tailing edge of document sheet P, the controller determines whether there is any document sheet P stacked on document tray 1 based on the detection result of document presence/absence sensor 1a. When it is determined that there is one or more document sheets P stacked on document tray 1, the controller rotates second conveyance motor 53 in the clockwise direction and energizes electromagnetic clutch 54, thereby rotating pickup roller 21 in the clockwise direction. With this operation, the next document sheet P' is fed from document tray 1 to separation roller 22 and separation pad 23 (see FIG. 17A). When first document detection sensor 31a detects the leading edge of next document sheet P', the controller conveys next document sheet P' by a predetermined amount until the leading edge of document sheet P' reaches first switchback roller unit 41 and then de-energizes electromagnetic clutch 54 to stop the rotation of pickup roller 21 and separation roller 22 (see FIG. 17B).

When second document detection sensor 9 detects the tailing edge of document sheet P, the controller conveys document sheet P by a predetermined amount and then ends the document scanning process. Also, the controller controls conveying document sheet P by a predetermined amount until the tailing edge of document sheet P passes through second switching member 38.

Figure 17A:
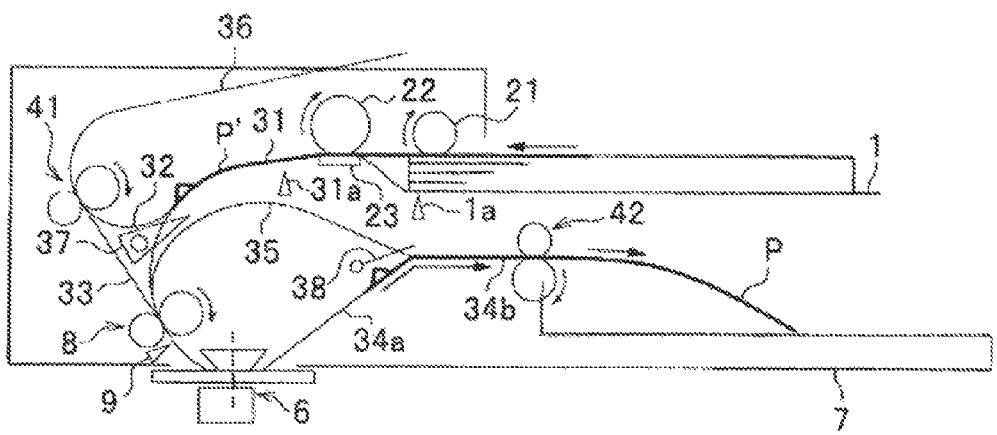
FIGS. 17A to 17C are explanatory views of the document conveyance procedure in the double-side scan operation of the image scanning apparatus according to the third embodiment.
Figure 17B:
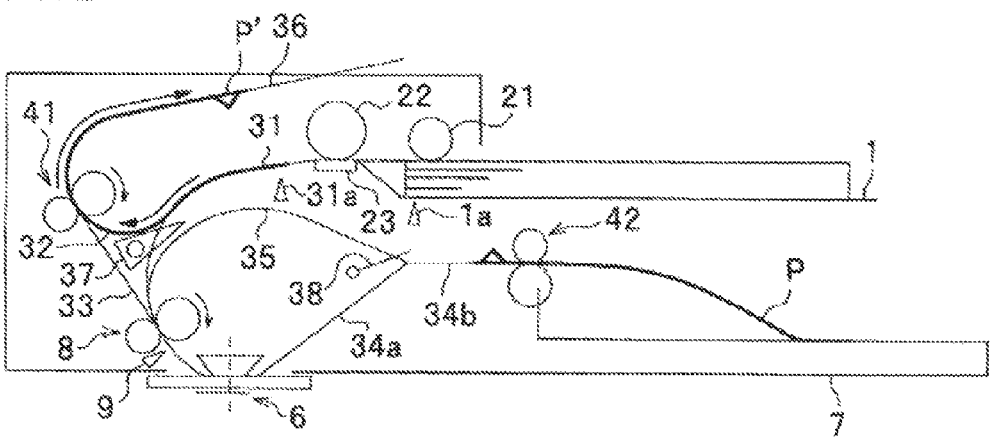

The controller stops second conveyance motor 53 when the posterior side of document sheet P is sandwiched by second switchback roller unit 42 (see FIG. 17B). Note that, in this configuration, when the posterior side of document sheet P is sandwitched by second switchback roller unit 42, the leading edge of document sheet P' reaches first switchback roller unit 41. After the conveyance of document sheet P is temporarily stopped, the controller controls switchback roller unit 41 to convey document sheet P' to first reverse section 36 (see FIG. 17B).

When first document detection sensor 31a detects the tailing edge of document sheet P', the controller controls to convey document sheet P' by a predetermined amount and then stops first conveyance motor 51 and also de-energizes electromagnetic clutch 56, thereby stopping the rotation of first switchback roller 41a. That is, the conveyance of document sheet P' is stopped with document sheet P' being sandwiched by first switchback roller unit 41. Next, while the controller keeps stopping the conveyance of document sheet P', the controller controls first conveyance motor 51 to rotate in the counterclockwise direction and second conveyance motor 53 to rotate in the counterclockwise direction. The counterclockwise rotation of second conveyance motor 53 conveys document sheet P that is sandwiched by second switchback roller unit 42 from second reverse section 34b of fourth conveyance path 34 into fifth conveyance path 35 (see FIG. 17C). At this time, second switching member 38 blocks normal conveyance section 34a of fourth conveyance path 34 by its weight, document sheet P is favorably conveyed from second reverse section 34b of fourth conveyance path 34 into fifth conveyance path 35. Document sheet P is further conveyed from fifth conveyance path 35 into first conveyance path 31 toward scan roller unit 8 (see FIG. 18A). Since scan roller 8a rotates in the counterclockwise direction when document sheet P being conveyed in first conveyance path 31 reaches scan roller unit 8, scan roller unit 8 conveys document sheet P toward scan unit 6 (see FIG. 18A).

Figure 18A:
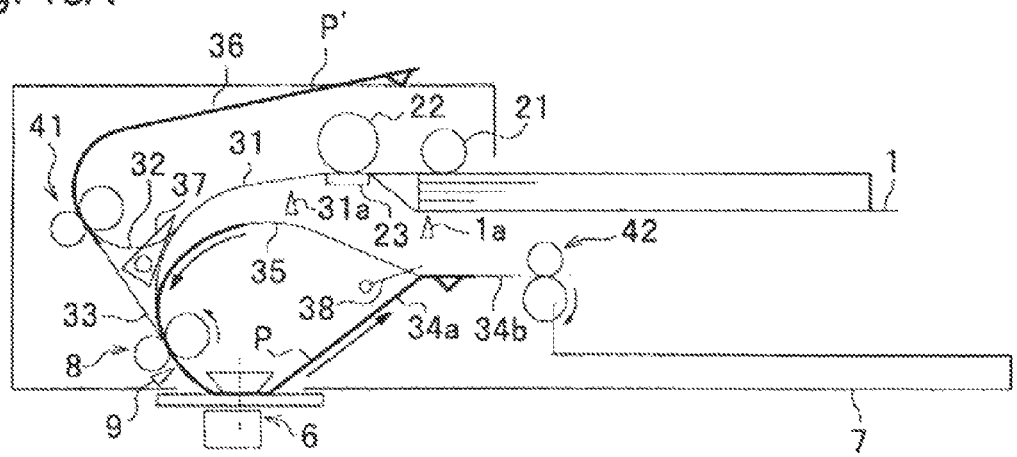
FIGS. 18A and 18B are explanatory views of the document conveyance procedure in the double-side scan operation of the image scanning apparatus according to the third embodiment.

Next, document sheet P that is fed toward scan unit 6 is passing above second document detection sensor 9, is detected by second document detection sensor 9, and is conveyed toward scan unit 6 (see FIG. 18A). When second document detection sensor 9 detects the leading edge of document sheet P, the controller controls conveying document sheet P by a predetermined amount and then starts the scanning process for document sheet P. When document sheet P passes through scan unit 6 toward normal conveyance section 34a of fourth conveyance path 34, the front side or the first side of the document sheet P, which was stacked facing upward in document tray 1 is scanned to obtain the image information (the image data) thereof (see FIG. 18A). When second document detection sensor 9 detects the tailing edge of document sheet P, the controller controls conveying document sheet P by a predetermined amount and then ends the scanning process of document sheet P. Next, document sheet P being conveyed in normal conveyance section 34a of fourth conveyance path 34 pushes away second switching member 38 to pass through second switching member 38 and is further conveyed into second reverse section 34b of fourth conveyance path 34 toward second switchback roller unit 42 (see FIG. 18B). Meanwhile, the controller calculates the travel distance (or the travel amount) of document sheet P from the beginning of the scanning process to the time when the leading edge of document sheet P reaches second switchback roller unit 42. The controller stops the rotation of second conveyance motor 53 just before the leading edge of document sheet P reaches second switchback roller unit 42, and then drives second conveyance motor 53 to rotate in the clockwise direction.

Figure 18B:
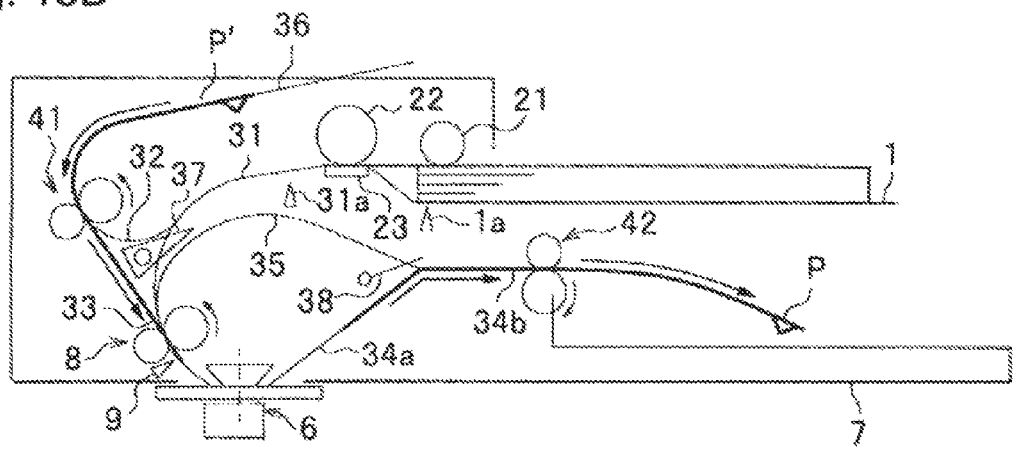

Next, since second switchback roller 42a rotates in the clockwise direction when document sheet P reaches second switchback roller unit 42, document sheet P is discharged to discharged document tray 7 (see FIG. 18B).

Figure 17C:
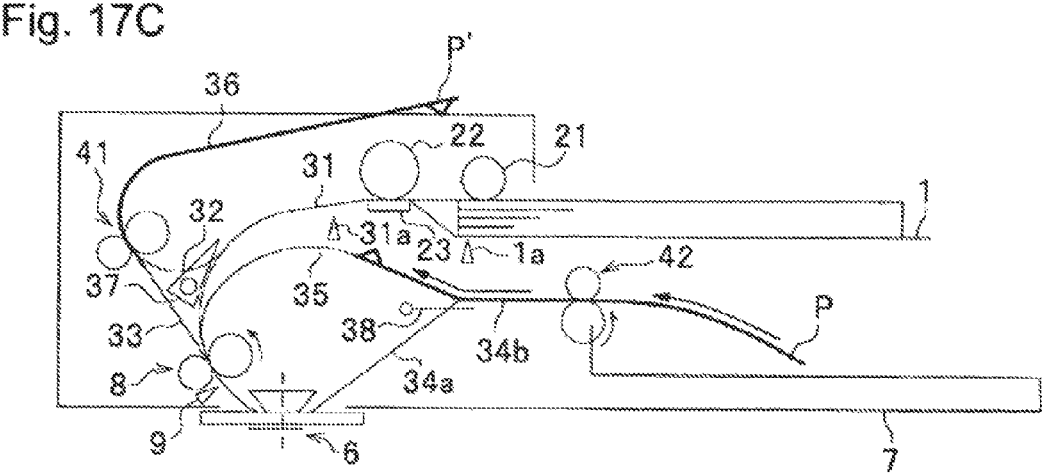

Note that until the scanning process of the both sides of document sheet P ends, document sheet P' waits while being sandwiched by first switchback roller unit 41 (see FIGS. 17C and 18A). At the time when the scanning process of both sides of document sheet P ends, electromagnetic clutch 56 is energized to rotate first switchback roller 41a in the counterclockwise direction, thereby conveying document sheet P' from first reverse section 36 into first conveyance path 31 (see FIG. 18B). Thus, the next document sheet P' can be conveyed to scan unit 6, while document sheet P is discharged to discharged document tray 7 (see FIG. 18B).

Note that second document detection sensor 9 detects the tailing edge of document sheet P', the controller determines whether or not there is any document sheet in document tray 1 based on the detection result of document presence/absence sensor 1a. Then, the above operation is repeated until no document sheet stacked in document tray 1 is detected. When it is determined that no document sheet is stacked in document tray 1, the controller controls to convey last document sheet P' by a predetermined amount until the last document sheet P' passes through second switchback roller unit 42 and then stops first conveyance motor 51 and second conveyance motor 53 and de-energizes electromagnetic clutch 54 and electromagnetic clutch 56, thereby ending the double-side scanning operation.

As described above, the third embodiment achieves the same effects as or similar effects to the first embodiment. Further, according to the third embodiment, the formula "L7/Vs>L6/Vh" is satisfied, where L6 (mm) represents the length of the route from pickup roller 21 as a start point through separation roller 22, first conveyance path 31, and second conveyance path 32 to first switchback roller unit 41 as an end point, L7 (mm) represents the length of the route from scan roller unit 8 as a start point through scan unit 6 and fourth conveyance path 34 to second switchback roller unit 42 as an end point, Vh (mm/s) represents the circumferential speed of separation roller 22, and Vs (mm/s) represents the circumferential speed of scan roller unit 8. With this configuration, in the double-side scanning operation, while one document sheet is scanned, the next document sheet can be conveyed. Consequently, the third embodiment shortens the time required for the double-side scan operation per one document sheet P and thus improves the image scanning efficiency.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A media feeder equipped in an image scanning apparatus that includes a scan unit configured to scan an image on a medium, comprising:

a first stacker on which a medium is to be placed;
a feeding unit configured to feed the medium that is placed on the first stacker into the media feeder;
a first conveyance path extending from the feeding unit to a scanning position opposite to the scan unit;
a second stacker on which the medium that is scanned by the scan unit and discharged out of the media feeder is to be placed;
a first reverse mechanism configured to turn over the medium conveyed toward the scanning position along the first conveyance path and return the turned-over medium to the first conveyance path;
a second reverse mechanism configured to turn over again the medium that is scanned by the scan unit and return the medium to the first conveyance path again, wherein
the first reverse mechanism includes:
  a switchback section diverging from the first conveyance path;
  a second conveyance path diverging from the first conveyance path at a first point of the first conveyance path, which is upstream of a diverging point between the first conveyance path and the switchback section, and converging to the first conveyance path at a second point of the first conveyance path, which is downstream of the diverging point between the first conveyance path and the switchback section, wherein the first conveyance path includes a first section extending from the feeding unit to the diverging point, a second section extending from the diverging point to the second point, and a third section extending from the second point to the scanning position; and
  a first conveying member provided in the second section and configured to convey the medium from the second conveyance path via the second section to the switchback section and then discharge the medium via the second section to the third section toward the scanning position.

2. The media feeder of claim 1, wherein
the second reverse mechanism functions as a discharging unit configured to discharge the medium that is scanned by the scan unit to the second stacker.

3. The media feeder of claim 1, further comprising:
a switching member provided in the first conveyance path and configured to be movable between a first position where the switching member leads the medium that is being conveyed along the first conveyance path to the scanning position and a second position where the switching member leads the medium that is being conveyed along the first conveyance path to the first reverse mechanism.

4. The media feeder of claim 3, further comprising:
a controller configured to control the switching member to move between the first position and the second position.

5. The media feeder of claim 1, wherein
the second reverse mechanism includes:
a fourth conveyance path diverging from a third conveyance path, which extends from the scanning position to the second stacker, and converging to the first conveyance path, wherein the third conveyance path includes an upstream section thereof and a downstream section thereof whose boundary is the diverging point between the third conveyance path and the fourth conveyance path; and
a second conveying member provided in the third conveyance path and configured to convey the medium from the upstream section of the third conveyance path via the downstream section of the third conveyance path to the fourth conveyance path and also to discharge the medium from the upstream section via the downstream section of the third conveyance path to the second stacker.

6. The media feeder of claim 5, further comprising
a switching member provided at a diverging point between the third conveyance path and the fourth conveyance path and configured to be movable between a first position where the switching member blocks the fourth conveyance path while communicating the upstream section to the downstream section of the third conveyance path and a second position where the switching member blocks the upstream section of the third conveyance path while communicating the downstream section of the third conveyance path to the fourth conveyance path.

7. The media feeder of claim 5, wherein
a formula "L4>L5" is satisfied, where L4 represents the length of a path from the second conveying member as a start point through the fourth conveyance path, the first conveyance path, and the third conveyance path to second conveying member as an end point, and L5 represents the length of a path from the diverging point between the first conveyance path and the second conveyance path as a start point through the second conveyance path to the first conveying member as an end point.

8. The media feeder of claim 1, further comprising
a housing accommodating therein at least the first conveyance path, the first reverse mechanism, and the second reverse mechanism, wherein
one end of the switchback section is exposed outside the housing.

9. The media feeder of claim 1, wherein
the switchback section is provided above the first conveyance path.

10. The media feeder of claim 1, wherein
the second stacker is provided beneath the first stacker.

11. An image scanning apparatus, comprising:
a scan unit configured to scan an image on a medium;
a first stacker on which the medium is to be placed;
a feeding unit configured to feed the medium that is placed on the first stacker toward the scan unit;
a first conveyance path extending from the feeding unit to a scanning position opposite to the scan unit;
a second stacker on which the medium that is scanned by the scan unit and discharged out of the image scanning apparatus is to be placed;
a first reverse mechanism configured to turn over the medium conveyed toward the scanning position along the first conveyance path and return the turned-over medium to the first conveyance path;
a second reverse mechanism configured to turn over again the medium that is scanned by the scan unit and return the medium to the first conveyance path again, wherein
the first reverse mechanism includes:
  a switchback section diverging from the first conveyance path;
  a second conveyance path diverging from the first conveyance path at a first point of the first conveyance path, which is upstream of a diverging point between the first conveyance path and the switchback section, and converging to the first conveyance path at a second point of the first conveyance path, which is downstream of the diverging point between the first conveyance path and the switchback section, wherein the first conveyance path includes a first section extending from the feeding unit to the diverging point, a second section extending from the diverging point to the second point, and a third section extending from the second point to the scanning position; and a first conveying member provided in the second section and configured to convey the medium from the second conveyance path via the second section to the switchback section and then discharge the medium via the second section to the third section toward the scanning position.

12. A multifunctional periphery, comprising:

the image scanning apparatus according to claim 11; and an image forming apparatus configured, based on the image on the medium scanned by the image scanning apparatus, to form a print image on a medium different from the scanned medium.

* * * * *